United States Patent
Szabo et al.

(10) Patent No.: US 8,438,253 B2
(45) Date of Patent: *May 7, 2013

(54) UPGRADING NETWORK TRAFFIC MANAGEMENT DEVICES WHILE MAINTAINING AVAILABILITY

(75) Inventors: Paul I. Szabo, Seattle, WA (US); Bryan D. Skene, Seattle, WA (US); Saxon Amdahl, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/480,943

(22) Filed: May 25, 2012

(65) Prior Publication Data

US 2013/0047026 A1 Feb. 21, 2013

Related U.S. Application Data

(63) Continuation of application No. 12/543,448, filed on Aug. 18, 2009, now Pat. No. 8,209,403.

(60) Provisional application No. 61/089,839, filed on Aug. 18, 2008.

(51) Int. Cl.
*G06F 11/20* (2006.01)
*G06F 9/44* (2006.01)
*G06F 15/16* (2006.01)

(52) U.S. Cl.
USPC .............. 709/220; 709/221; 709/222; 714/1; 714/4.1

(58) Field of Classification Search .......... 709/220–222, 709/219, 225, 226, 227–229; 714/1, 4.1–4.5; 717/168–178
See application file for complete search history.

(56) References Cited

U.S. PATENT DOCUMENTS

| | | | |
|---|---|---|---|
| 6,006,259 A | 12/1999 | Adelman et al. |
| 6,044,461 A | 3/2000 | Agha et al. |
| 6,078,957 A | 6/2000 | Adelman et al. |
| 6,202,097 B1 | 3/2001 | Foster et al. |
| 6,205,562 B1 | 3/2001 | Fukushima et al. |
| 6,308,282 B1 | 10/2001 | Huang et al. |
| 6,324,692 B1 | 11/2001 | Fiske |

(Continued)

OTHER PUBLICATIONS

Microsoft Support Article 813827, "How to change the default keep-alive time-out value in Inter Explorer," Oct. 27, 2007, Microsoft, support.microsoft.com/kb/813827).*

(Continued)

*Primary Examiner* — Ruolei Zong
(74) *Attorney, Agent, or Firm* — Frommer Lawrence & Haug LLP; Jamie L. Wiegand

(57) ABSTRACT

A method, system, machine-readable storage medium, and apparatus are directed towards upgrading a cluster by bifurcating the cluster into two virtual clusters, an "old" virtual cluster (old active cluster) and a "new" virtual cluster (new standby cluster), and iteratively upgrading members of the old cluster while moving them into the new cluster. While members are added to the new cluster, existing connections and new connections are seamlessly processed by the old cluster. Optionally, state mirroring occurs between the old cluster and the new cluster once the number of members of the old and new clusters are approximately equal. Once a threshold number of members have been transferred to the new cluster, control and processing may be taken over by the new cluster. Transfer of control from the old cluster to the new cluster may be performed by failing over connectivity from the old cluster to the new cluster.

20 Claims, 25 Drawing Sheets

U.S. PATENT DOCUMENTS

| | | |
|---|---|---|
| 6,542,934 B1 | 4/2003 | Bader et al. |
| 6,681,389 B1 | 1/2004 | Engel et al. |
| 6,691,244 B1 | 2/2004 | Kampe et al. |
| 6,757,836 B1 | 6/2004 | Kumar et al. |
| 6,763,479 B1 | 7/2004 | Hebert |
| 6,779,176 B1 | 8/2004 | Chambers, II et al. |
| 6,802,021 B1 | 10/2004 | Cheng et al. |
| 6,813,242 B1 | 11/2004 | Haskin et al. |
| 6,883,108 B2 | 4/2005 | Lee et al. |
| 6,976,071 B1 | 12/2005 | Donzis et al. |
| 7,076,645 B2 | 7/2006 | Mittal et al. |
| 7,124,320 B1 | 10/2006 | Wipfel |
| 7,165,250 B2 | 1/2007 | Lyons |
| 7,257,731 B2 | 8/2007 | Hunt et al. |
| 7,260,737 B1* | 8/2007 | Lent et al. .................. 714/5.11 |
| 7,620,040 B2 | 11/2009 | Bhaskaran |
| 2002/0007468 A1 | 1/2002 | Kampe et al. |
| 2003/0125084 A1* | 7/2003 | Collins ........................ 455/560 |
| 2003/0149735 A1 | 8/2003 | Stark et al. |
| 2004/0024853 A1* | 2/2004 | Cates et al. .................. 709/223 |
| 2004/0049573 A1 | 3/2004 | Olmstead et al. |
| 2004/0078632 A1 | 4/2004 | Infante et al. |
| 2004/0153701 A1 | 8/2004 | Pickell |
| 2004/0153704 A1 | 8/2004 | Bragulla et al. |
| 2004/0158575 A1 | 8/2004 | Jacquemot et al. |
| 2004/0210898 A1 | 10/2004 | Von Bergen et al. |
| 2004/0267980 A1 | 12/2004 | McBrearty et al. |
| 2005/0102562 A1 | 5/2005 | Shinohara et al. |
| 2005/0125557 A1 | 6/2005 | Vasudevan et al. |
| 2006/0146821 A1 | 7/2006 | Singh et al. |
| 2007/0261049 A1* | 11/2007 | Bankston et al. ............. 717/170 |
| 2008/0243990 A1 | 10/2008 | Mallik et al. |
| 2009/0007135 A1* | 1/2009 | Rathunde et al. ............. 718/107 |
| 2009/0144720 A1* | 6/2009 | Roush et al. .................. 717/171 |
| 2010/0042869 A1 | 2/2010 | Szabo et al. |

OTHER PUBLICATIONS

International Search Report for International Patent Application No. PCT/US2009/054222 mailed Mar. 5, 2010.

Written Opinion of the International Searching Authority for International Patent Application No. PCT/US2009/054222 mailed Mar. 5, 2010.

Official Communication for U.S. Appl. No. 12/543,448 mailed Sep. 15, 2011.

Official Communication for U.S. Appl. No. 12/543,448 mailed Feb. 28, 2012.

* cited by examiner

UPGRADING NETWORK TRAFFIC MANAGEMENT DEVICES WHILE MAINTAINING AVAILABILITY

CROSS-REFERENCE TO RELATED APPLICATIONS

The present application is a continuation application claiming priority from U.S. patent application Ser. No. 12/543,448 entitled "Upgrading Network Traffic Management Devices While Maintaining Availability," filed on Aug. 18, 2009, which in turn claims priority to U.S. Provisional Application Ser. No. 61/089,839 entitled "Low Impact Connection Mirroring And Failover On A Network," filed on Aug. 18, 2008, the benefit of the earlier filing date is hereby claimed under 35 U.S.C. §§119 (e), 120, and which are each further incorporated herein by reference.

TECHNICAL FIELD

The technology relates generally to network devices, and more particularly, but not exclusively, to upgrading clustered network traffic management device members without substantially impacting availability for managing existing and new network traffic.

TECHNICAL BACKGROUND

The Internet has evolved into a ubiquitous network that has inspired many companies to rely upon it as a major resource for doing business. For example, many businesses may utilize the Internet, and similar networking infrastructures, to manage critical applications, access content servers, automate assembly and production lines, and implement complex control systems. Moreover, many individuals expect to be able to always access a resource virtually any time. As the reliance by businesses on access to such networked resources for their success increases, the availability of the systems that provide these services becomes even more critical.

A Blade Server is one type of cluster-based component that allows a user to provision servers or other computing resources on an individual card, or "blade". These blades are housed together with shared resources such as power supplies and cooling fans in a chassis, creating a high-density system with a modular architecture that provides improved flexibility and scalability. Blade Servers can enable the operation of multiple servers in a relatively small footprint, reduce rack complexity, simplify cabling and reduce energy consumption. Blade Servers are often employed in space-constrained and energy conscious environments such as data centers and Internet Service Providers (ISPs).

Upgrading the hardware or software of blade servers in a computing environment, however, can be a difficult, time consuming, and error-prone process. Further, implementing an upgrade can negatively impact the connection-handling and other processes of the environment being upgraded. Blade servers may represent one example of members in a cluster network. However, other cluster-based network devices may have similar problems during hardware and/or software upgrades.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

Figure 1:
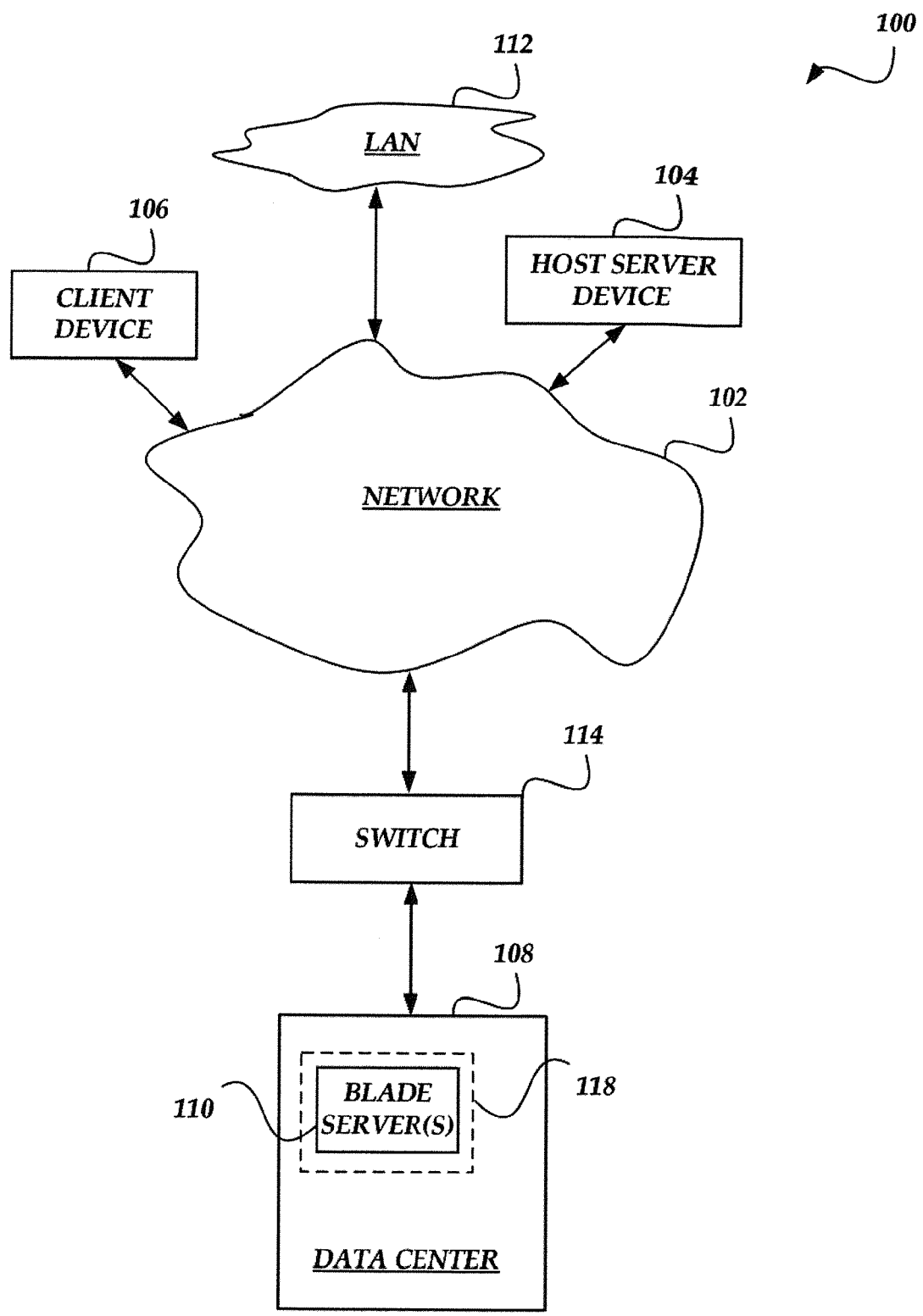
FIG. 1 shows a schematic overview of an exemplary environment for practicing the described embodiments.

In the following detailed description of exemplary embodiments, reference is made to the accompanied drawings, which form a part hereof, and which show by way of illustration examples by which the described embodiments may be practiced. Sufficient detail is provided to enable those skilled in the art to practice the described embodiments, and it is to be understood that other embodiments may be utilized, and other changes may be made, without departing from the spirit or scope. Furthermore, references to "one embodiment" are not required to pertain to the same or singular embodiment, though they may. The following detailed description is, therefore, not to be taken in a limiting sense, and the scope of the described embodiments is defined only by the appended claims.

Throughout the specification and claims, the following terms take the meanings explicitly associated herein, unless the context clearly dictates otherwise.

The term "user" refers to any person or customer such as a business or organization that employs a device to communicate or access resources over a network.

The term "Blade Server" refers to a server that is provisioned on a single card that is typically clustered with other Blade Servers (multiple cards) in a single chassis or rack. Blade Servers are also sometimes referred to as high density, ultra-dense or hyper-dense solutions, where they are often employed for processing-light and transaction-heavy applications. Each Blade Server is typically dedicated to a single task or process, including, but not limited to, file sharing, file virtualization/network storage file management, Web page serving, network security management (e.g., firewalls, authentication, credential management), caching, transcoding, streaming media (video, audio), network traffic management (e.g., load balancing, failover management, acceleration/optimization), and establishing virtual private networks, although a blade server may also be configured to perform one or more combinations of these tasks in conjunction. A Blade Server usually includes its own operating system and an application to which it is dedicated, although again a blade server may include one or more operating systems and one or more applications to enable performing different tasks.

The term "upgrade" refers to software upgrades, including operating system version upgrades, although the term should be interpreted broadly to encompass any and other types of software changes, including enabling inactive software code (e.g., driven by software license purchase activities), configuration changes to running software (e.g., hot-fixes, patches, etc.), re-programming or re-purposing a device to perform altogether different functionalities, or any change that might otherwise interrupt a device's normal operations (e.g., traffic management related operations); the term should also be interpreted to include hardware upgrades.

To tightly package a Blade Server in a relatively small footprint (single card), the Blade Server will typically use a highly miniaturized and energy efficient Central Processing Unit (CPU) such as those employed in portable computing devices. Typically, rows of individual Blade Servers (which closely resemble the functionality of a motherboard) are in communication with each other over a commonly shared and relatively high-speed bus. In a chassis that is rack mountable, an exemplary Blade Server based solution can enable the operation of hundreds of CPUs within the confines of a relatively standard six-foot rack.

As used herein, the term "cluster," refers to loosely coupled network devices that cooperate to integrate services, resources, or the like, to provide a device external to the cluster with access to the service, resource, and the like, the cluster appearing to the external device as a single entity on the network. Each network device within the cluster is referred to as a member of the cluster. The members of the cluster may be blades, or "Blade Servers" as discussed above, or any other network enabled device, such as will be described below in conjunction with FIG. 4.

Briefly stated, embodiments are directed towards upgrading a cluster by bifurcating the cluster into two virtual clusters, an "old" virtual cluster (old active cluster) and a "new" virtual cluster (new standby cluster), and iteratively upgrading members of the old cluster while moving them into the new cluster. While members are added to the new cluster, existing connections and new connections are seamlessly processed by the old cluster. Optionally, state mirroring occurs between the old cluster and the new cluster once the number of members of the old and new clusters are approximately equal. Once a threshold number of members have been transferred to the new cluster, control and processing may be taken over by the new cluster. Transfer of control from the old cluster to the new cluster may be performed by failing over connectivity from the old cluster to the new cluster.

In one embodiment, state mirroring may include mirroring configuration state, session state, and connection state to the new cluster. In one embodiment, configuration state may include hundreds of kinds of data that collectively define the operational state of the cluster. For example, configuration state may include what TCP stack options the cluster is using, the type of address translation the cluster is using, virtual server to physical server mappings, user defined runtime rules, and the like. In one embodiment, session state may include data that spans two or more connections, such as client to server mapping data (typically a URI or a client network address that is mapped to a specific server network address), client authorization data, SSL session data, and the like. In one embodiment, connection state may include transport layer connection data, including the source and destination IP address and TCP port, as well as a routing identifier such as a VLAN.

In one embodiment, mirroring connection state includes allowing existing connections being handled by members of the old cluster to drain. A member is drained by redirecting new connections to other members of the old cluster while allowing existing connections to end. Once a member of the old cluster is no longer processing connections, that member may be seamlessly transferred to the new cluster.

Optionally, the time required to drain off an existing connection from a member of the old cluster may be reduced by actively draining, or "bleeding off" the connection. In one embodiment, "bleeding off" a connection includes modifying network data, for example application specific network data (OSI layer 7 data), in order to gracefully decrease the time required for the connection to be closed. In one embodiment, bleeding off a connection includes reducing an HTTP Keep-Alive value of the connection, although other embodiments are similarly contemplated.

In one embodiment, once connectivity has failed over to the new cluster, new connections are handled by the new cluster. Members remaining in the old cluster may then be upgraded and added to the new cluster.

Traditional approaches of upgrading a cluster utilize a physically separate standby cluster to process connections while the primary cluster is upgraded. During normal operation the standby cluster operates in "hot standby mode", in which connections made with the primary cluster are mirrored by the standby cluster. By mirroring connections, the standby cluster maintains state, including connection state, that is virtually identical to the state of the primary cluster. When a failure occurs in the primary cluster during normal operation, the standby cluster may gracefully take control of and process the existing mirrored connections, as well as new connections, until the failed primary cluster returns online. During an upgrade, the standby cluster may similarly be used to process existing and new connections while the primary cluster is being upgraded.

Traditional approaches of upgrading a cluster begin by taking the standby cluster off-line and upgrading it. Once the standby cluster is upgraded, virtually all network traffic is directed to the upgraded standby cluster while the primary cluster is taken off-line and upgraded.

Many problems and costs are associated with these traditional approaches. First, requiring a physically separate standby cluster may add significantly to the cost of the overall system. Second, the traditional approaches leave a window of time during which failure of the active cluster, either primary or standby, may cause all existing connections to be dropped. Third, even without a failure to either cluster, difficulty transferring configuration state between clusters of different versions causes some connections to be dropped. Specifically, connections created after the standby cluster has been upgraded and brought online, but before the primary cluster has been upgraded and brought online, will be dropped in the traditional approaches when control is transferred to the upgraded standby cluster.

As for the second problem with the traditional approaches, the window of time during which failure may become catastrophic occurs when one of the clusters is being upgraded. Clearly, state mirroring and failover cannot occur while a cluster is in the process of an upgrade. Thus, during an upgrade any failure to the active cluster would be catastrophic. Accordingly, such traditional approaches leave the system in a vulnerable state.

As for the third problem with the traditional approaches, connections formed at the primary cluster are not mirrored by the standby cluster while the standby cluster is being upgraded. Thus, these connections are not part of any shared state between the clusters when it is time for the primary cluster to be upgraded. However, it may be difficult if not completely impractical to transfer configuration state between clusters having different software versions or hardware configurations in a timely manner. As discussed above, the configuration state of a cluster may contain hundreds of kinds of data, often requiring a manual step to map configuration state from one version to another. Traditional approaches do not provide a mechanism to manually perform these mappings without leaving the cluster in a vulnerable state for an extended period of time. So, these new connections may be dropped in the traditional approaches when control is passed from the primary cluster to the upgraded standby cluster. As such, the embodiments described herein are directed toward addressing many of these deficiencies of the traditional approaches.

Illustrative Operating Environment

FIG. 1 shows components of an exemplary environment 100 in which the described embodiments may be practiced. Not all the components may be required to practice the described embodiments, and variations in the arrangement and type of the components may be made without departing from the spirit or scope of the described embodiments. FIG. 1 illustrates a wide area network, such as network 102, that enables communication between client device 106, host server device 104, local area network (LAN) 112 and data center 108 where at least one Blade Server 110 is disposed. Switch 114 connects and enables communication between network 102 and data center 108. In one embodiment, blade servers 110 may be members of one or more clusters. Each cluster 118 may appear to switch 114 as a single network entity, having a single network address. For instance, each cluster may have a unique Open Systems Interconnection (OSI) Layer 2 (L2) network address.

Figure 2:
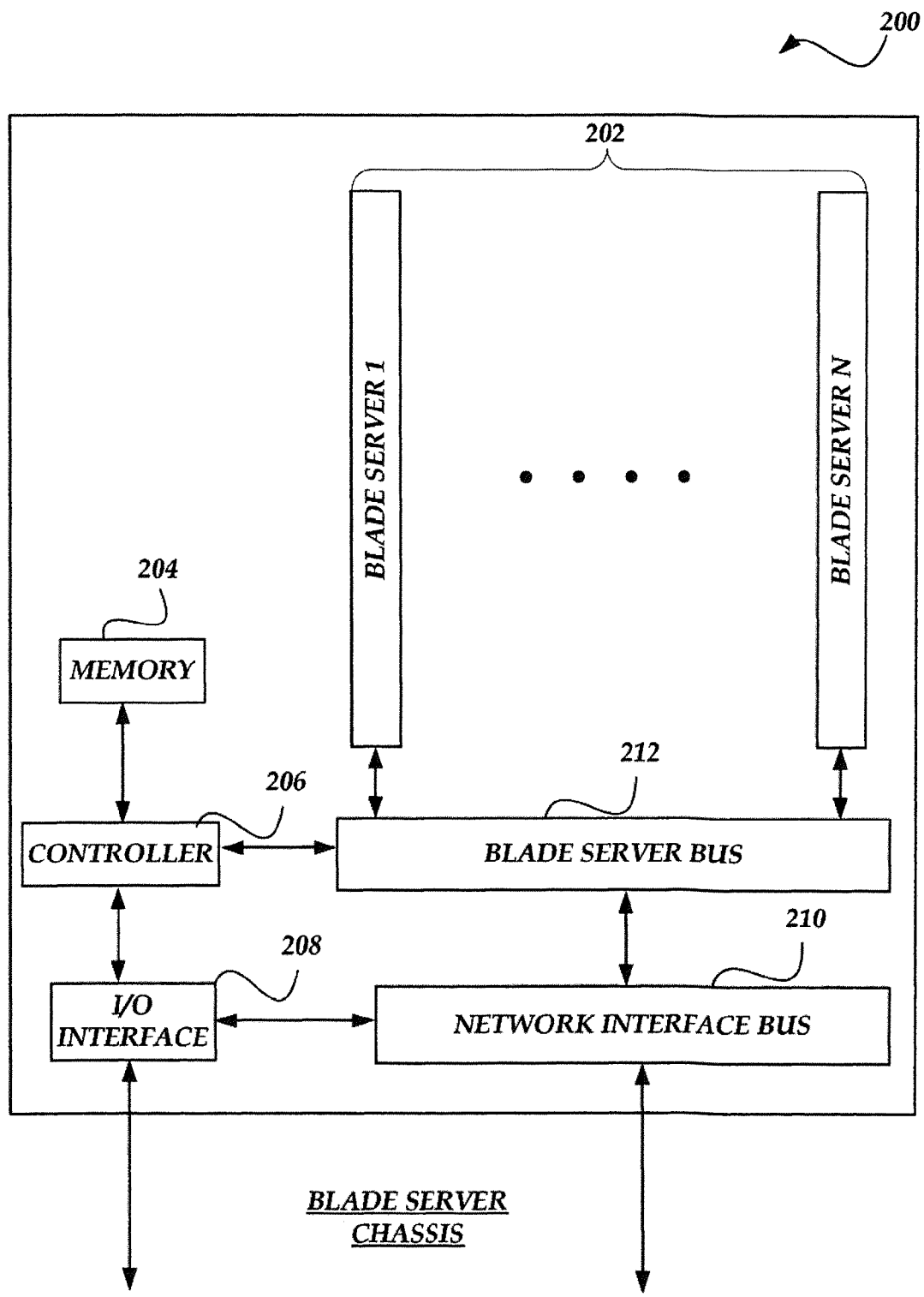
FIG. 2 illustrates a schematic overview of an exemplary chassis for enabling the operation of multiple Blade Servers, wherein each blade may operate as a cluster member.

FIG. 2 shows an overview of an exemplary blade server chassis 200. Not all the components may be required to practice the described embodiments, and variations in the arrangement and type of the components may be made without departing from the spirit or scope of the described embodiments. Blade Server Chassis 200 includes controller 206 in communication with memory 204, Input/Output (I/O) interface 208, network interface bus 210 and blade server bus 212. Typically, a cluster of blades comprises all of the blades located in a blade server chassis, although a cluster may comprise any subset of blades on a blade server chassis, or blades from more than one blade server chassis. Although not shown, blade server bus 212 may include multiple slots for blade servers 202. Also, blade server bus 212 can be arranged to support any one of several bus architectures, including, but not limited to, HyperTransport™, Fibre Channel, Peripheral Component Interconnect (PCI), Integrate Drive Electronics (IDE), Industry Standard Architecture (ISA), Advanced Graphic Port (AGP), Firewire, Small Computer Serial Interface (SCSI), Universal Serial Bus (USB), and the like. However, in at least one embodiment, blade server bus 212 supports a HyperTransport™ architecture.

Figure 3:
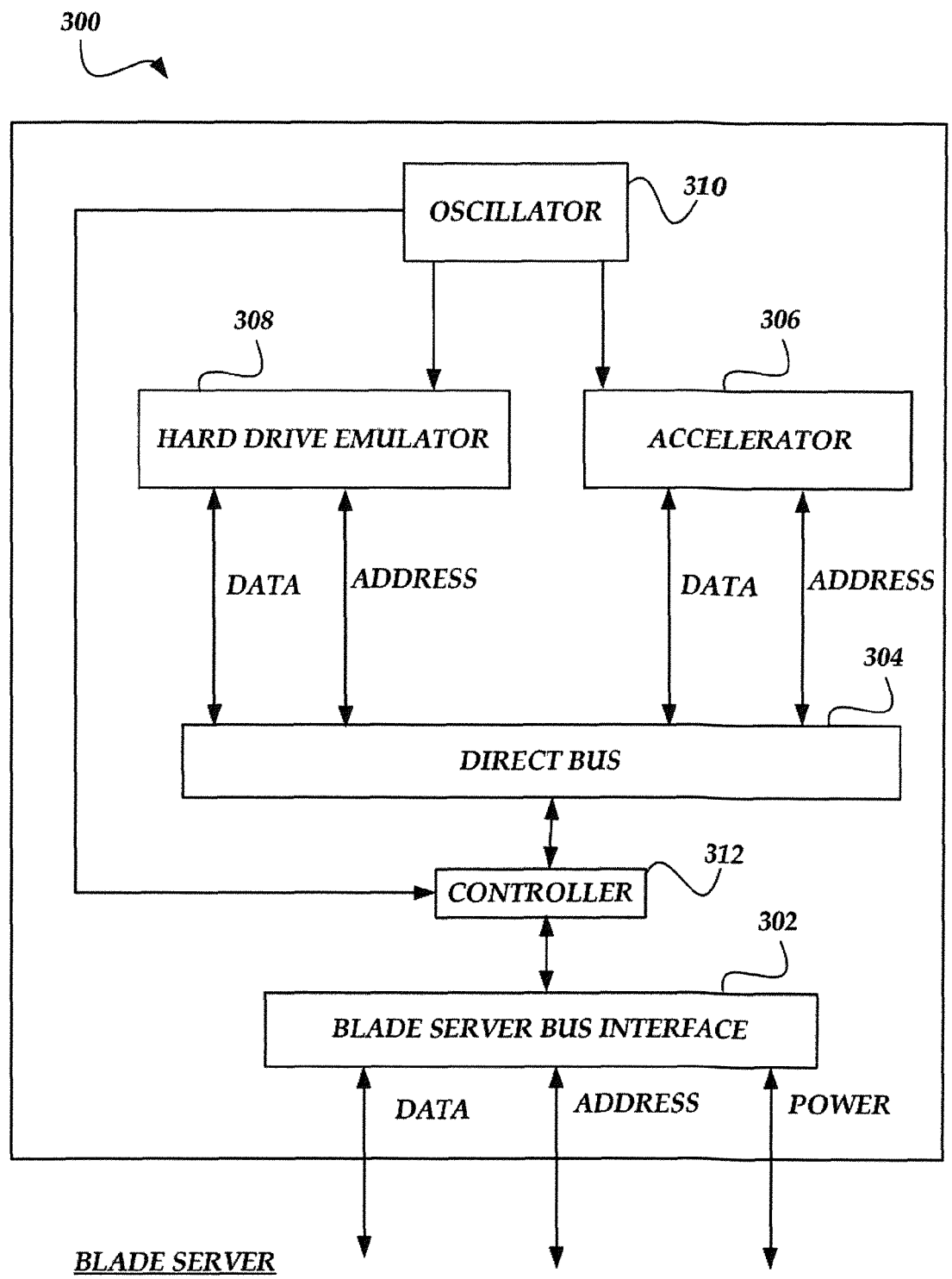
FIG. 3 shows a schematic overview of an exemplary card for enabling the operation of a Blade Server with a hard drive emulator and an accelerator for cryptographic functions.

FIG. 3 illustrates an exemplary blade server card 300 that is employable as a blade server within FIG. 2. Not all the components may be required to practice the described embodiments, and variations in the arrangement and type of the components may be made without departing from the spirit or scope of the described embodiments. Controller 312 is coupled to direct bus 304, which enables communication of data and addresses with hard drive emulator 308 and accelerator 306. Almost all of an application may be stored in hard drive emulator 308 for relatively quick access by logical actions performed with controller 312. Direct bus 304 can employ a bus architecture, including, but not limited to, HyperTransport™, Fibre Channel, IDE, USB, ISA, PCI, AGP, SCSI, Firewire, Serial, and the like. However, since a relatively small amount of data may be communicated between accelerator 306 and an application operating in controller 312 and hard drive emulator 308 (often 100 bytes or less), a relatively low speed bus architecture can be employed with direct bus 304, in one embodiment.

Controller 312 is coupled to and enables communication over direct bus 304. Controller 312 is also coupled to blade server bus interface 302, which enables communication of data and addresses. In one embodiment, blade server bus interface 302 receives power for blade server card 300 and operates as a PCI bus. Additionally, oscillator 310 is coupled to controller 312, hard drive emulator 308 and accelerator 306 to enable the synchronization of data and addresses communicated over direct bus 304. Additionally or alternatively, a blade server card 300 may include a physical hard disk drive.

Also, controller 312 may be provided in any one of several types of devices, including, but not limited to, CPU, microcontroller, Field Programmable Gate Array (FPGA) Programmable Logic Device (PLD), Application Specific Integrated Circuit (ASIC), and the like.

Figure 4:
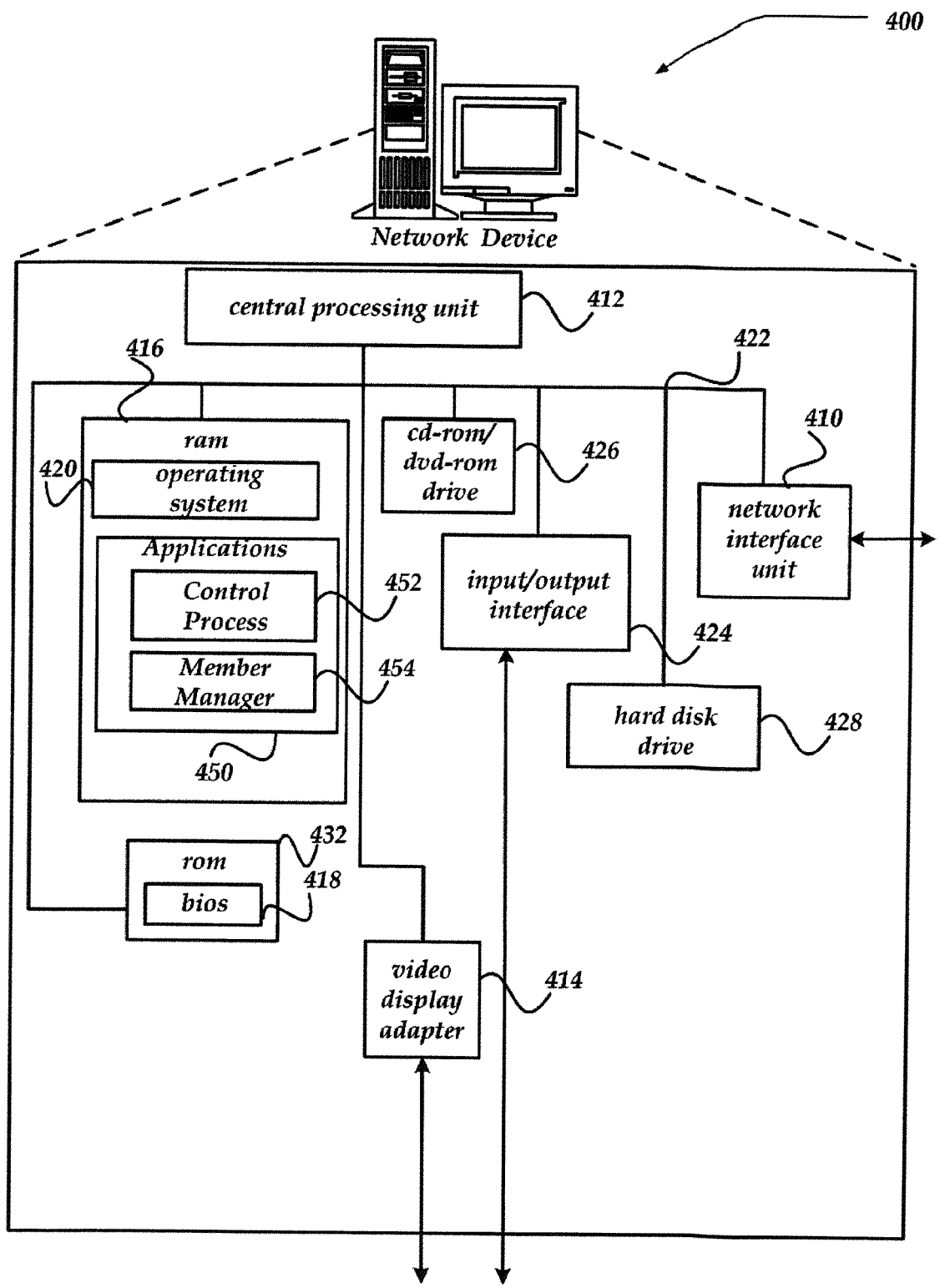
FIG. 4 shows a network device as another embodiment of a cluster member.

As noted, cluster members, and cluster architectures are not constrained to blade server architectures. Thus, for example, FIG. 4 illustrates a schematic overview of an exemplary network device 400 that is employable as a member of a cluster. In one embodiment, network device 400 may include a stateful network device, such as a traffic management device. A stateful network device maintains information about a transport layer of a networking framework, for example OSI layer 4 or the TCP layer of TCP/IP. Additionally or alternatively, network device 400 may include a stateless network device that maintains data link and/or network layer information, such as OSI layers 2 and 3. Network device 400 may include many more or less components than those shown. The components shown, however, are sufficient to disclose an illustrative embodiment. Network Device 400 may replace blade server 110 of FIG. 1 in a similar system. Further, any tasks or functionality performed by network device 400 may be performed by the blade server 110 (and vice versa). Network Device 400 could be a server, a traffic management device, application servers, or the like. One embodiment of the process performed by at least some components of network device 400 is described in more detail in conjunction with FIGS. 5-10.

Network device 400 includes at least one processing unit 412 (each unit 412 having one or more processing cores), video display adapter 414, and a mass memory, all in communication with each other via bus 422. Moreover, one or more processing units 412 (and/or cores within each unit 412), may replace (or supplement) blade server 110. The mass memory generally includes RAM 416, ROM 432, bios 418, and one or more permanent mass storage devices, such as hard disk drive 428, tape drive, optical drive, and/or floppy disk drive. The mass memory stores operating system 420 for controlling the operation of network device 400.

As illustrated in FIG. 4, network device 400 also can communicate with switch 114, network 102, or some other communications network via one or more network interface units 410, which is constructed for use with various communication protocols including the TCP/IP protocol. Network interface unit 410 is sometimes known as a transceiver, transceiving device, or network interface card (NIC); and where the device 400 includes more than one processing unit 412 (or a unit 412 has more than one core), each unit 412 (and/or core) may use the same single network interface unit 410 or a plurality of units 410.

The mass memory 416, 426, 428, and 432 described herein and shown in FIG. 4 illustrate another type of computer-readable media, namely computer readable or processor readable storage media, which are examples of machine-readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by a processor, such as at least one central processing unit (CPU) 412, to perform actions, including one or more portions of processes 800, 900, and/or 1000 of FIGS. 8-10, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing device.

The mass memory may also store other types of program code and data as applications 450, which may be loaded into mass memory and run on operating system 420. Examples of applications 450 may include web browser, email client/server programs, routing programs, schedulers, web servers, calendars, database programs, word processing programs, Hyper Text Transfer Protocol (HTTP) programs, Real-Time Streaming Protocol (RTSP) programs, security programs, and any other type of application program. Applications 450 also include control process (CP) 452 and member manager 454.

Network device 400 may also include a Simple Mail Transfer Protocol (SMTP) handler application for transmitting and receiving e-mail, an HTTP handler application for receiving and handing HTTP requests, an RTSP handler application for receiving and handing RTSP requests, and an HTTPS handler application for handling secure connections. The HTTPS handler application may initiate communication with an external application in a secure fashion. Moreover, network device 400 may further include applications that support virtually any secure connection, including TLS, TTLS, EAP, SSL, IPSec, and the like.

Network device 400 may also include input/output interface 424 for communicating with external devices, such as a mouse, keyboard, scanner, or other input/output devices not shown in FIG. 4. Likewise, network device 400 may further include additional mass storage facilities such as cd-rom/dvd-rom drive 426 and hard disk drive 428. Hard disk drive 428 may be utilized to store, among other things, application programs, databases, and the like in the same manner as the other mass memory components described above.

In one embodiment, the network device 400 may include at least one ASIC chip (not shown) coupled to bus 422. The ASIC chip can include logic that performs some or all of the actions of network device 400. For example, in one embodiment, the ASIC chip can perform a number of packet processing functions for incoming and/or outgoing packets.

In one embodiment, network device 400 can further include one or more field-programmable gate arrays (FPGA) (not shown), instead of, or in addition to, the ASIC chip. A number of functions of network device 400 can be performed by the ASIC chip, the FPGA, by CPU 412 with instructions stored in memory, or by any combination of the ASIC chip, FPGA, and a CPU.

Control Process 452 includes any component configured to perform a seamless software or hardware upgrade of a cluster of network devices. Embodiments utilizing control process 452 are illustrated in FIGS. 5-10.

Member manager 454 includes any component for performing cluster specific processing. For instance, when network device 400 comprises a Blade Server, member manager 454 may perform processing including, but not limited to, file sharing, Web page serving, caching, transcoding, streaming audio, streaming video, load balancing and failover management, and other network technologies typically implemented by a cluster architecture. When network device 400 comprises a server computer, member manager 454 may include, for example, file and print sharing services.

While network device 400 is shown to include control process 452 and member manager 454, in alternate embodiments, at least some of these components may not be included and may be optional, and/or alternate or other components may be included.

Generalized Operation

Figure 8:
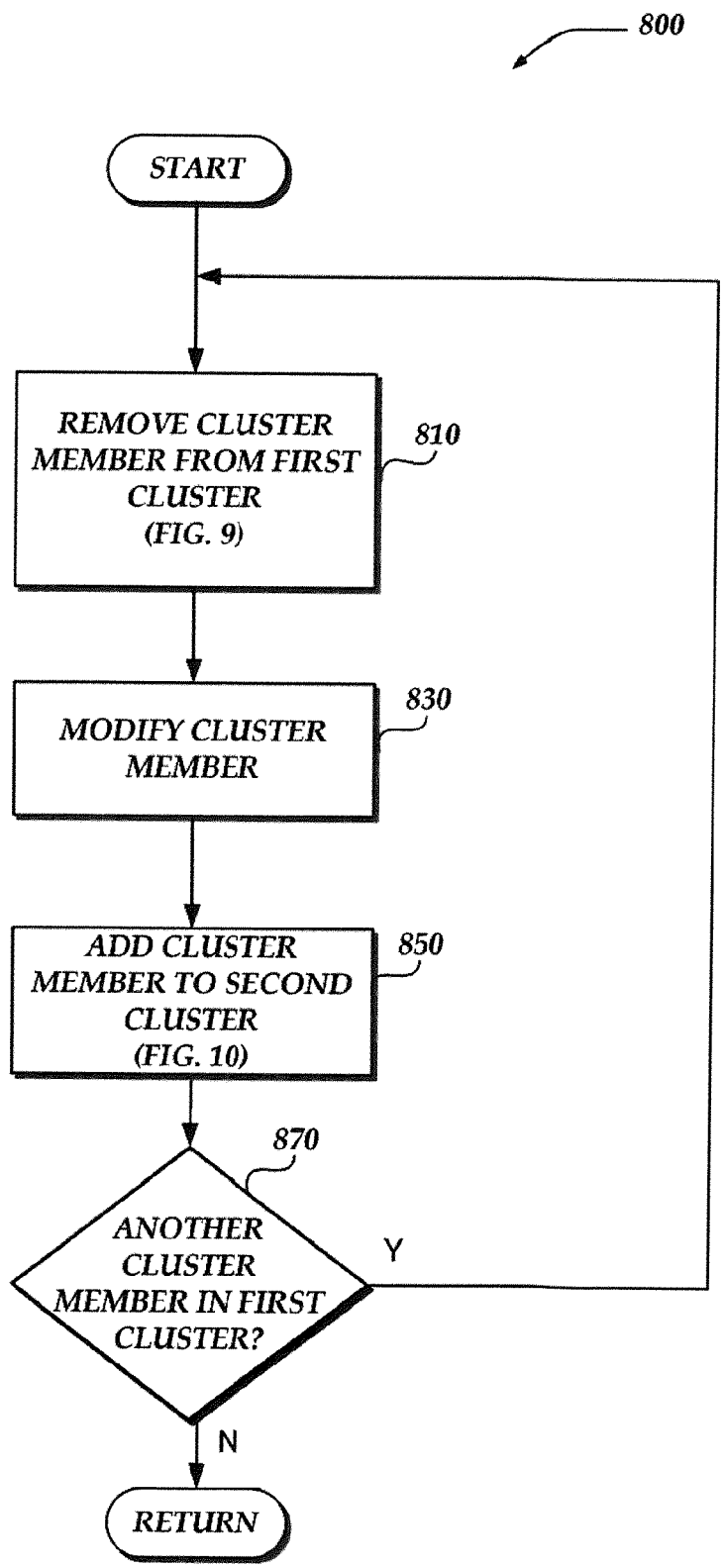
FIG. 8 illustrates a logical flow diagram generally showing one embodiment of a process for removing a member from a first cluster and adding it to a second cluster.
Figure 9:
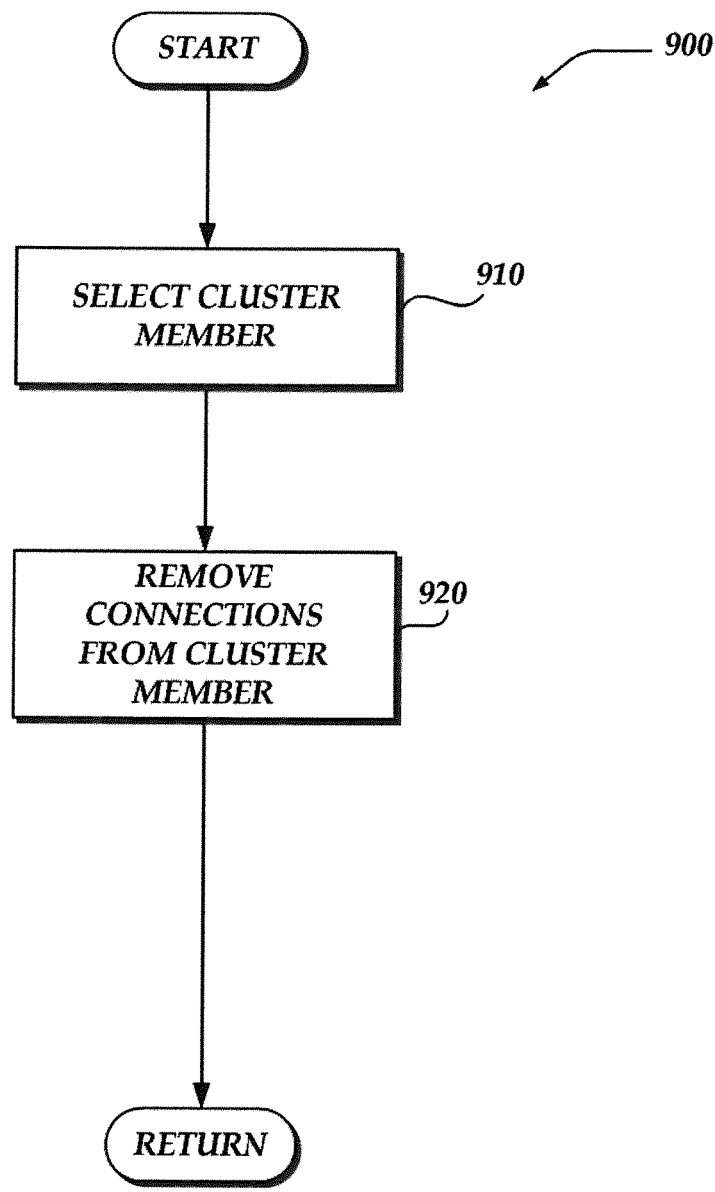
FIG. 9 illustrates a logical flow diagram generally showing one embodiment of a process for removing connections from a member of a cluster.
Figure 10:
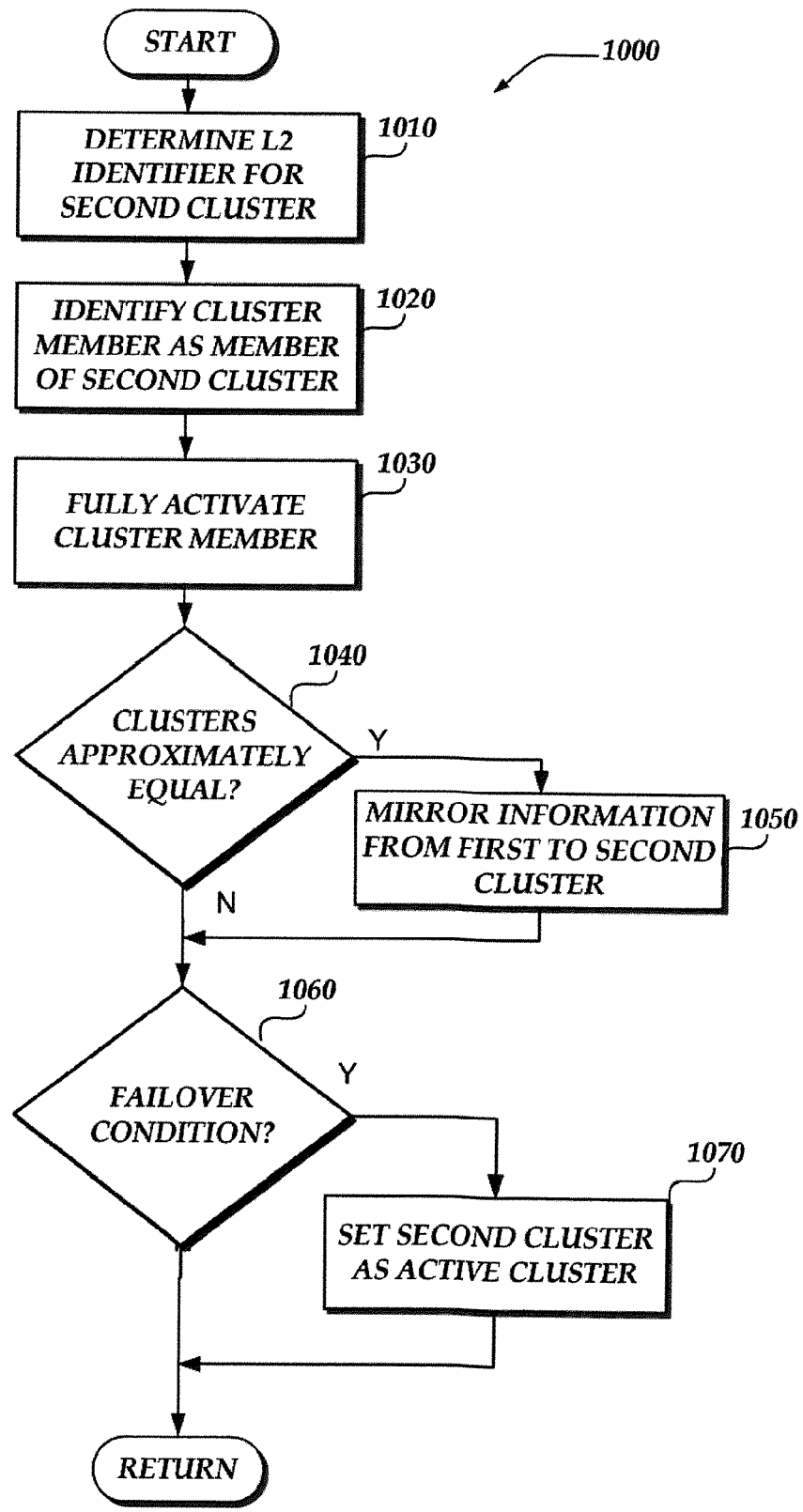
FIG. 10 illustrates a logical flow diagram generally showing one embodiment of a process for bifurcating a cluster.

The operation of certain aspects will now be described with respect to FIGS. 5-10. FIGS. 5-7 provide environments and steps of certain aspects, while FIGS. 8-10 provide logical flow diagrams of certain aspects.

FIGS. 5A-5G illustrate one embodiment for upgrading members of a cluster. In one embodiment, an administrator may add a member cluster at runtime, with no cost or effect to the existing members or to network traffic. The newly installed member may be completely overwritten upon installation. Additionally or alternatively, software may be pre-installed onto a member before the member is added to the cluster. A member containing pre-installed software may be installed into the cluster without having to then install the software, thereby reducing the amount of time required to bring a member online. The components of FIGS. 5A-5G may include more or fewer components than illustrated. However, the components shown are sufficient to disclose one embodiment or illustration.

Figure 5A:
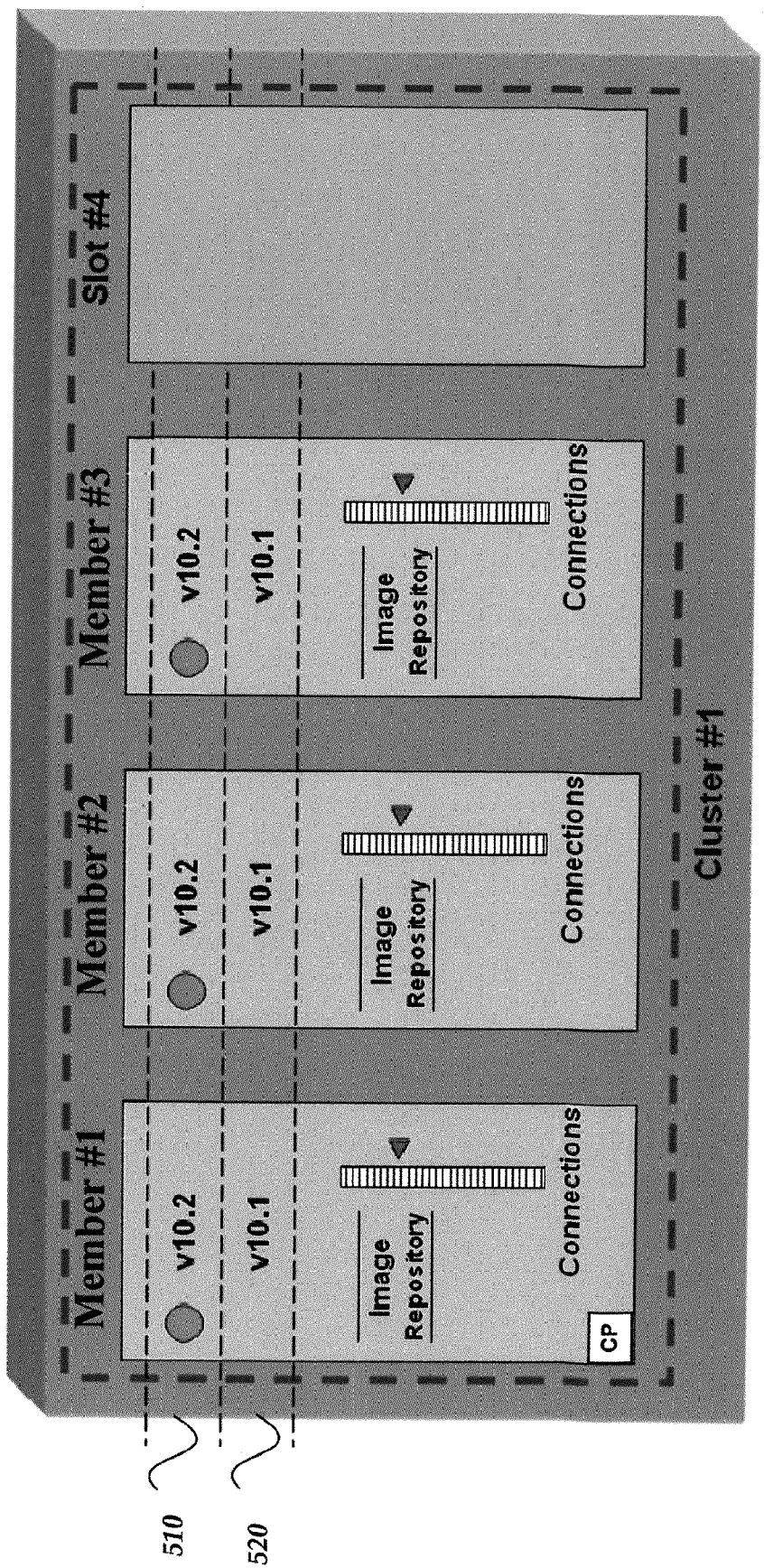
FIGS. 5A-5F illustrate a cluster environment involved with one embodiment of providing low impact connection mirroring and failover.

FIG. 5A illustrates an initial state of Cluster #1. Cluster #1 includes Member #1, Member #2, and Member #3. Although FIG. 5A depicts a cluster containing four slots and three members, a cluster may include virtually any number of members and any number of open slots. As shown, however, each of Members #1, #2, and #3 comprise two boot partitions—partition 510 and partition 520. A partition may have an operating system and/or other software installed on it. For example, partition 510 of each of Members #1-#3 have software version 10.2 installed. In one embodiment, a single partition may be active while any remaining partitions are inactive, as is indicated in FIG. 5A by a circle adjacent to the active software version.

In one embodiment, a member may be added to an open slot, such as Slot #4, if a license allowing the additional member has been acquired. However, in other embodiments, a license might not be required.

Figure 5B:
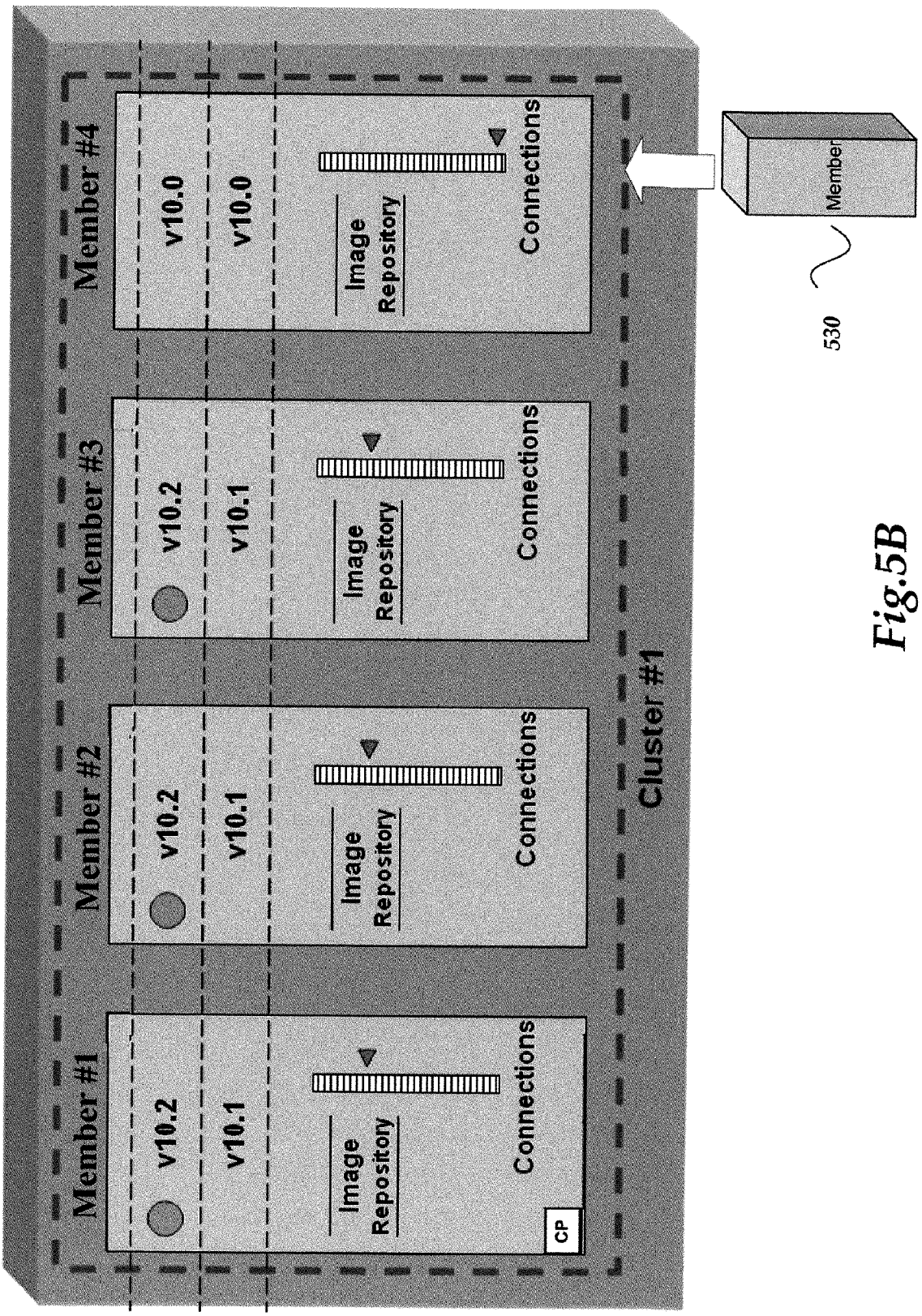
Figure 5C:
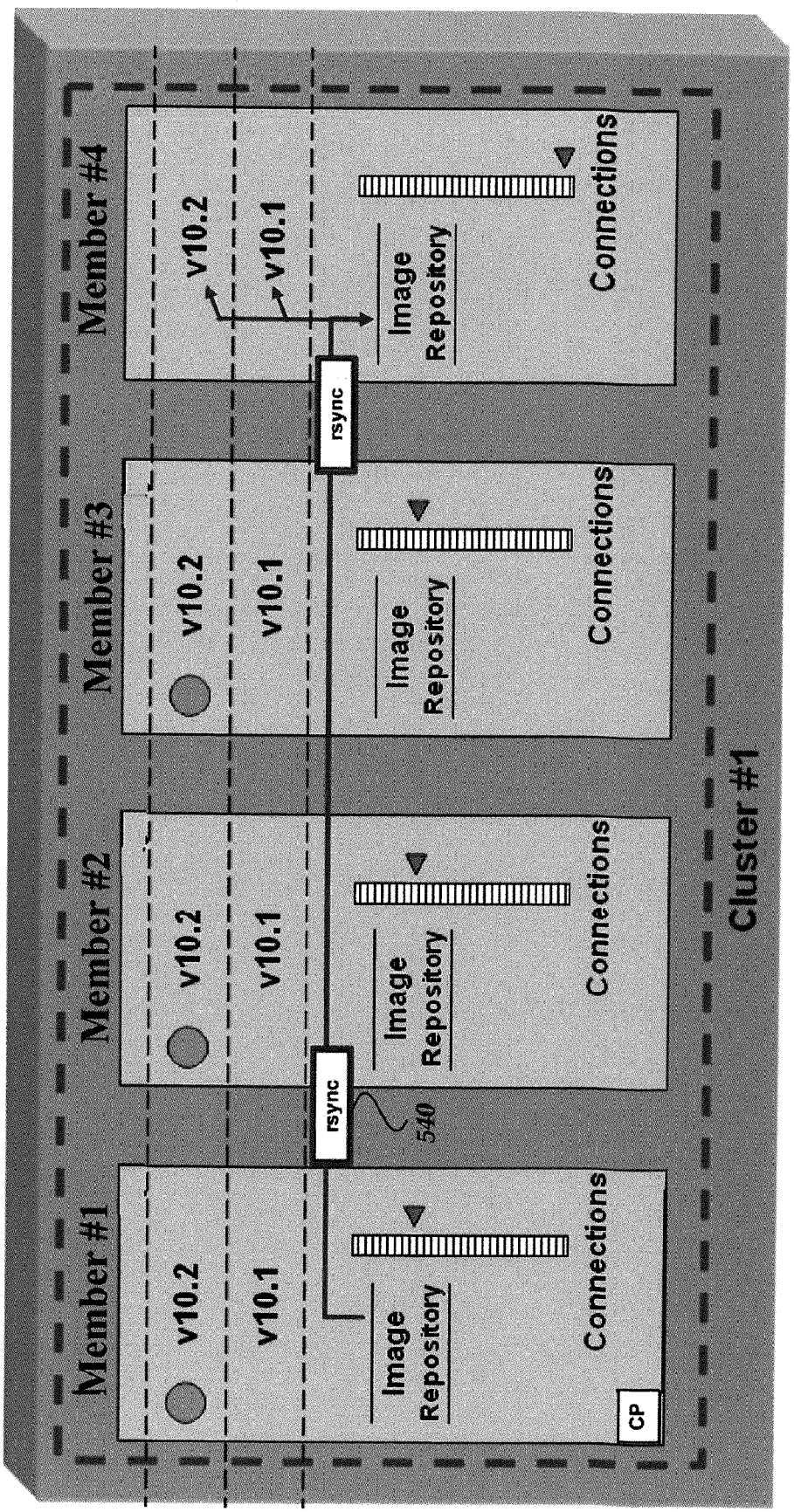

FIG. 5B illustrates a Member 530 being plugged into Slot #4. In one embodiment, software is automatically installed onto Member 530 upon Member 530 being plugged into Slot #4, as depicted in FIG. 5C below. Additionally or alternatively, software may have been primed, or previously installed onto Member 530 prior to Member 530 being plugged into Slot #4. The existing software on Member 530 may be automatically upgraded upon Member 530 being plugged into Slot #4.

FIG. 5C illustrates synchronizing installed software images. First, the installed software versions are copied to Member #4 from one of the existing members. For instance, a software image may be copied in its entirety from an image repository of Member #1 to the image repository of Member #4. In another embodiment, the software image may be synchronized by copying only portions of the software necessary such that Member #4 contains the same software as Members #1-#3. In one embodiment, more than one version of a software program may be copied to or synchronized with Member #4. In one embodiment, a synchronization program such as rsync 540 may be used to perform the software synchronization.

Once the software images are synchronized, one or more of the synchronized software images may be locally installed onto one or more partitions of Member #4. As is depicted in FIG. 5C, version 10.2 may be installed onto partition 510 of Member #4, while version 10.1 may be installed onto partition 520 of Member #4.

Figure 5D:
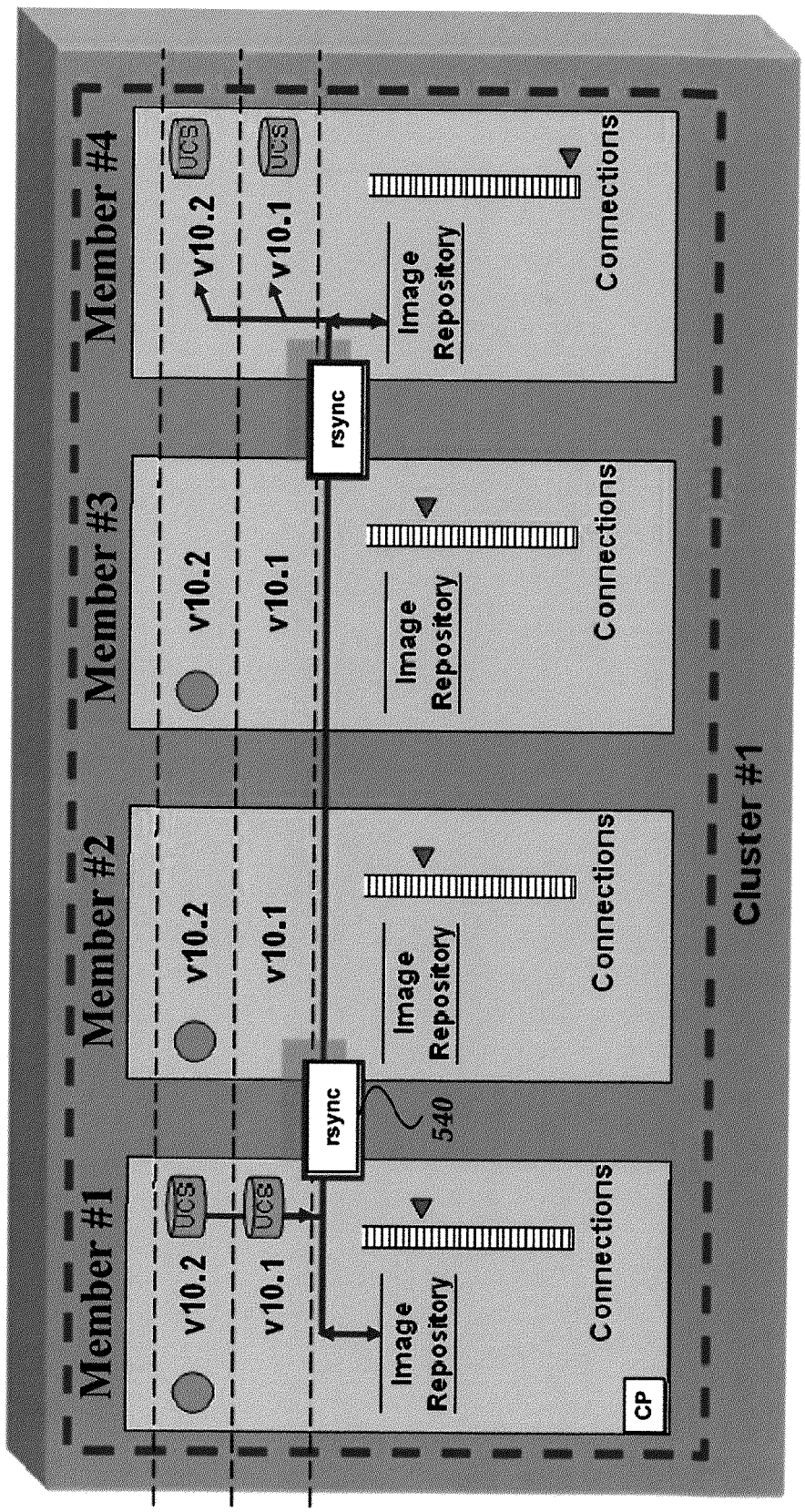

FIG. 5D illustrates configuration synchronization. A user Configuration Set (UCS) may be synchronized between an existing Member (such as Member #1) and Member #4. In one embodiment, rsync 540 is used to perform the configuration synchronization. In one embodiment, a system administrator may update the UCS before the UCS is synchronized with the remaining Members. In one embodiment, UCS files are installed into the image repository of each Member, after which the UCS files may be locally installed onto a partitions 510 and 520.

Figure 5E:
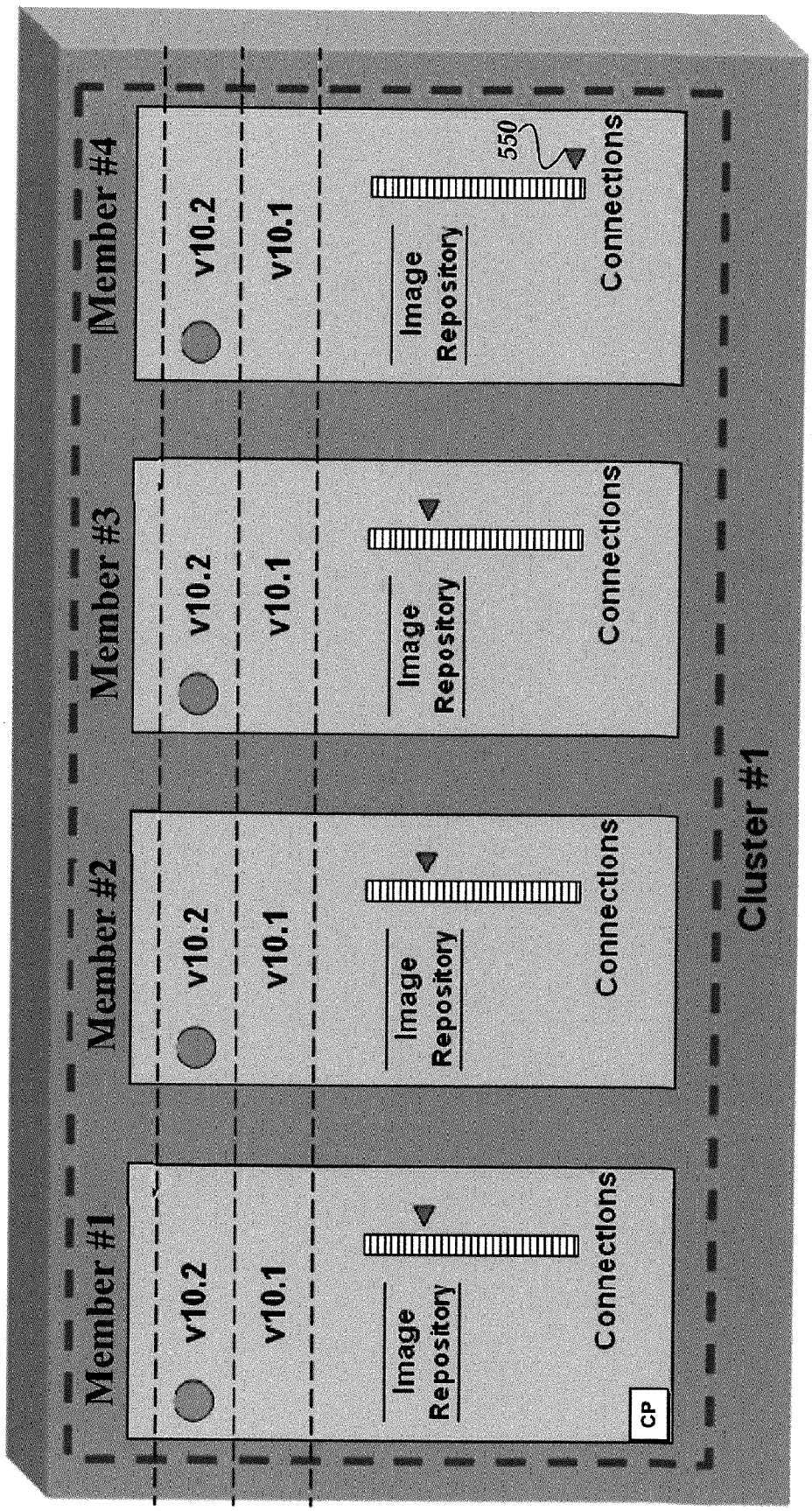

FIG. 5E illustrates boot up. Member #4 boots into the active boot partition. In the illustrated embodiment, the active boot partition is boot partition 510 containing software version 10.2. Any optional post-install activities may then be performed, such as loading the User Configuration Set (UCS) into memory. Upon boot-up, initially there may be few if any connections 550 handled by Member #4.

Figure 5F:
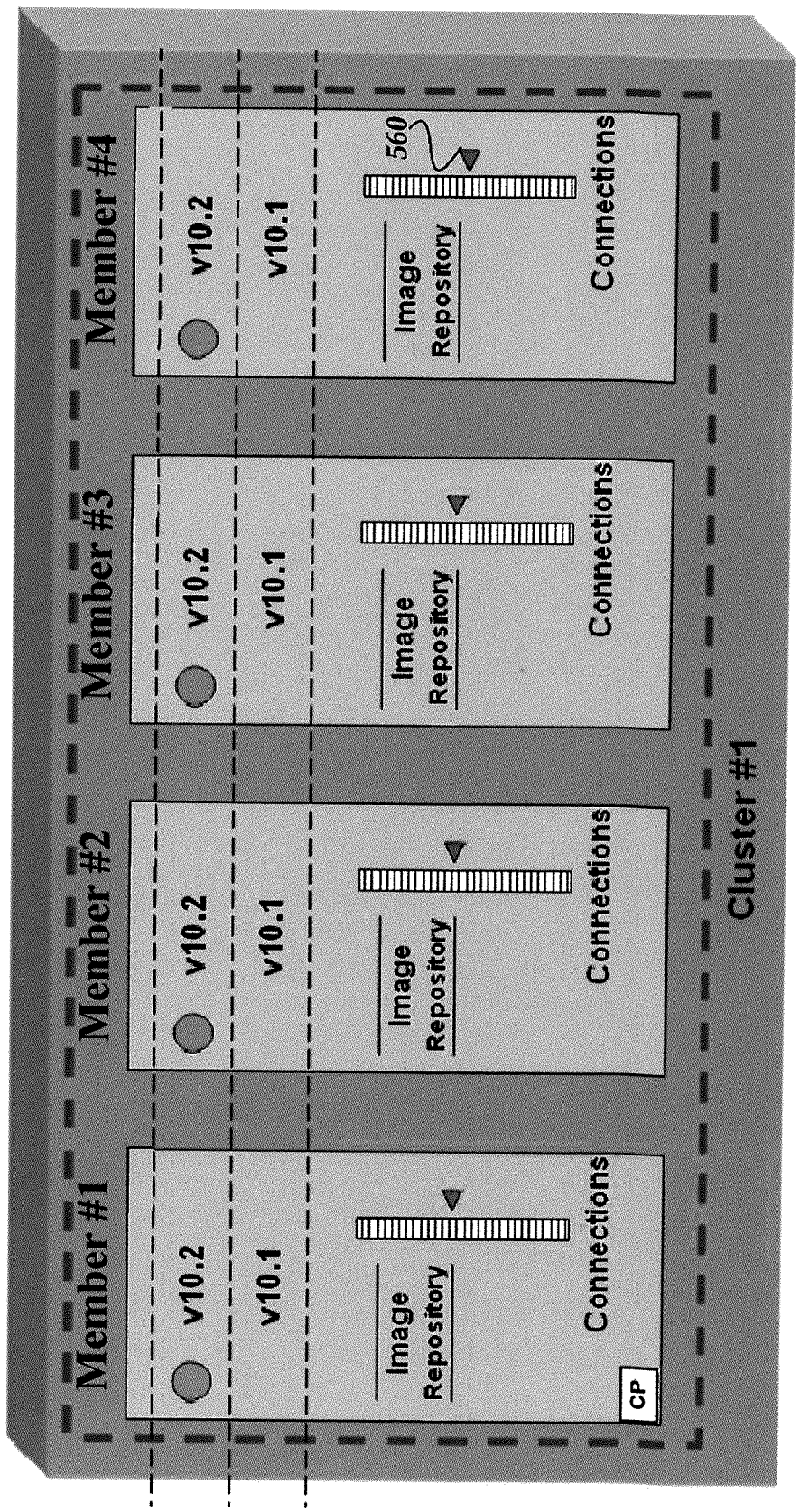

FIG. 5F illustrates normal operations once the cluster is running. Member #4 has acquired a license, loaded the current software version and configuration data, and begins processing connections 560.

Figure 6A:
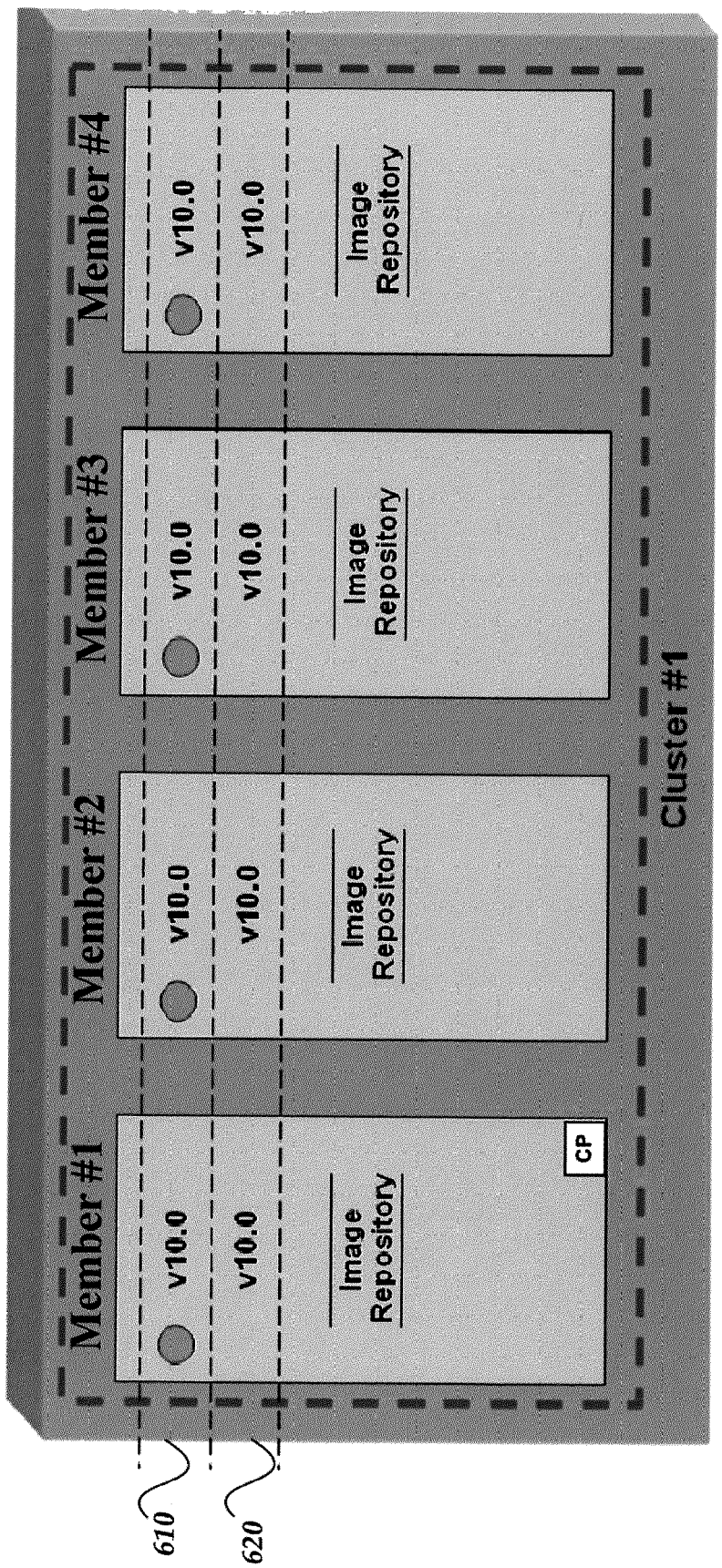
FIGS. 6A-6D illustrate a cluster environment involved with one embodiment of providing low impact connection mirroring and failover.

FIGS. 6A-6D illustrate one embodiment for a rolling install of members in a cluster environment. Additionally or alternatively, a rolling upgrade of members in a cluster environment is performed. A rolling install and/or upgrade enables a cluster to upgrade an inactive boot partition to a new software version with no downtime. In one embodiment, all members of the cluster are executing the same software version. For instance, as depicted in FIG. 6A, boot partition 610 and boot partition 620 both have software version 10.0 installed. The components of FIGS. 6A-6D may include more or fewer components than illustrated. However, the components shown are sufficient to disclose one embodiment or illustration.

FIG. 6A illustrates at least one environment for a rolling install/upgrade. For instance, boot partition 610 may have an initial software version installed, such as software version 10.0. Similarly, boot partition 620 may have an initial software version installed, such as software version 10.0. Software version 10.0 is used as an example—other software versions and other versioning systems are similarly contemplated.

Figure 6B:
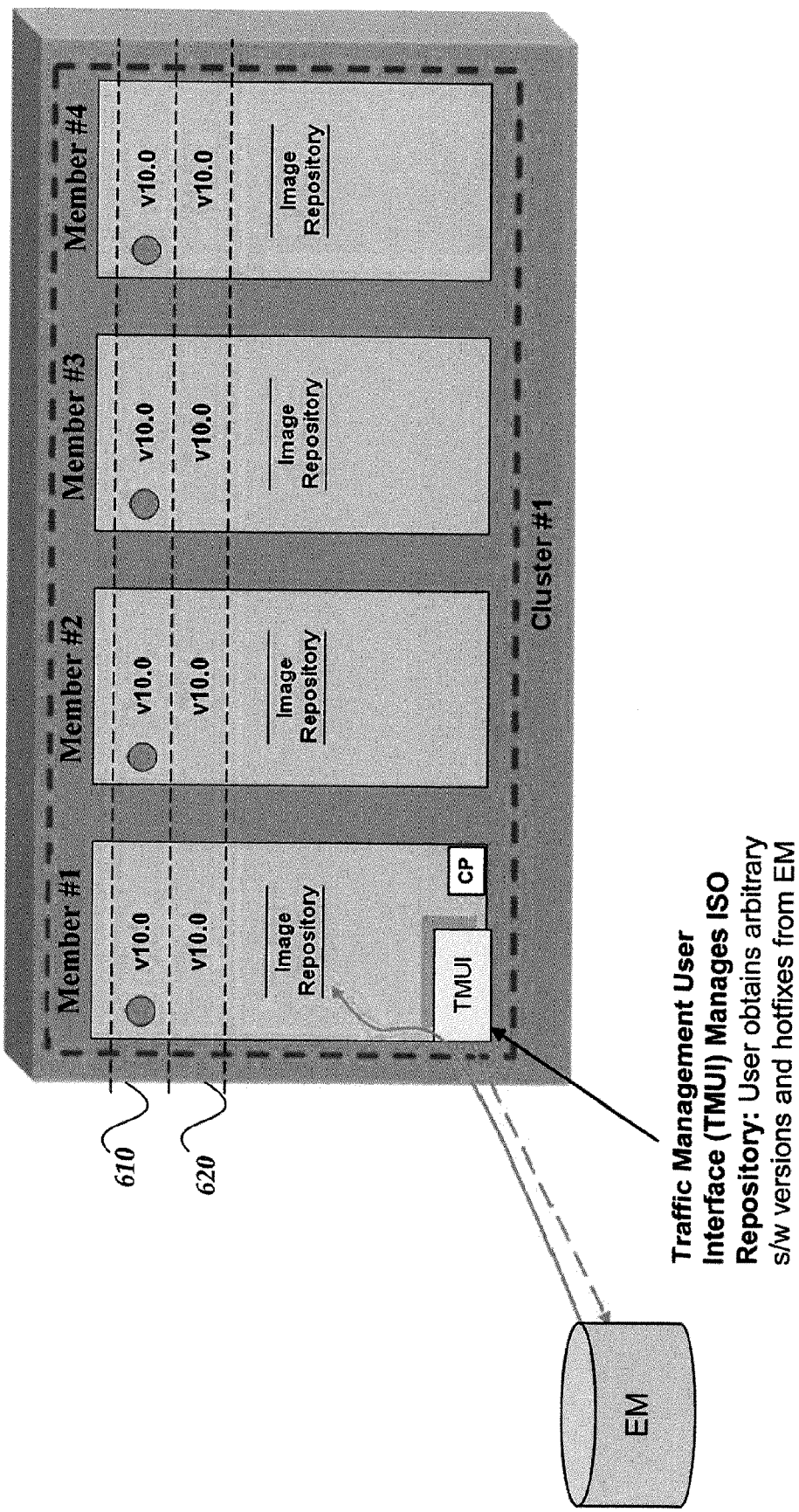

FIG. 6B illustrates a Traffic Manager User Interface (TMUI). In one embodiment, TMUI manages the image repository, which stores software programs and entire software images. Software images, either complete software programs or hotfixes, may be downloaded by the TMUI from a network repository. In one instance, the network repository is an Enterprise Manager (EM).

Figure 6C:
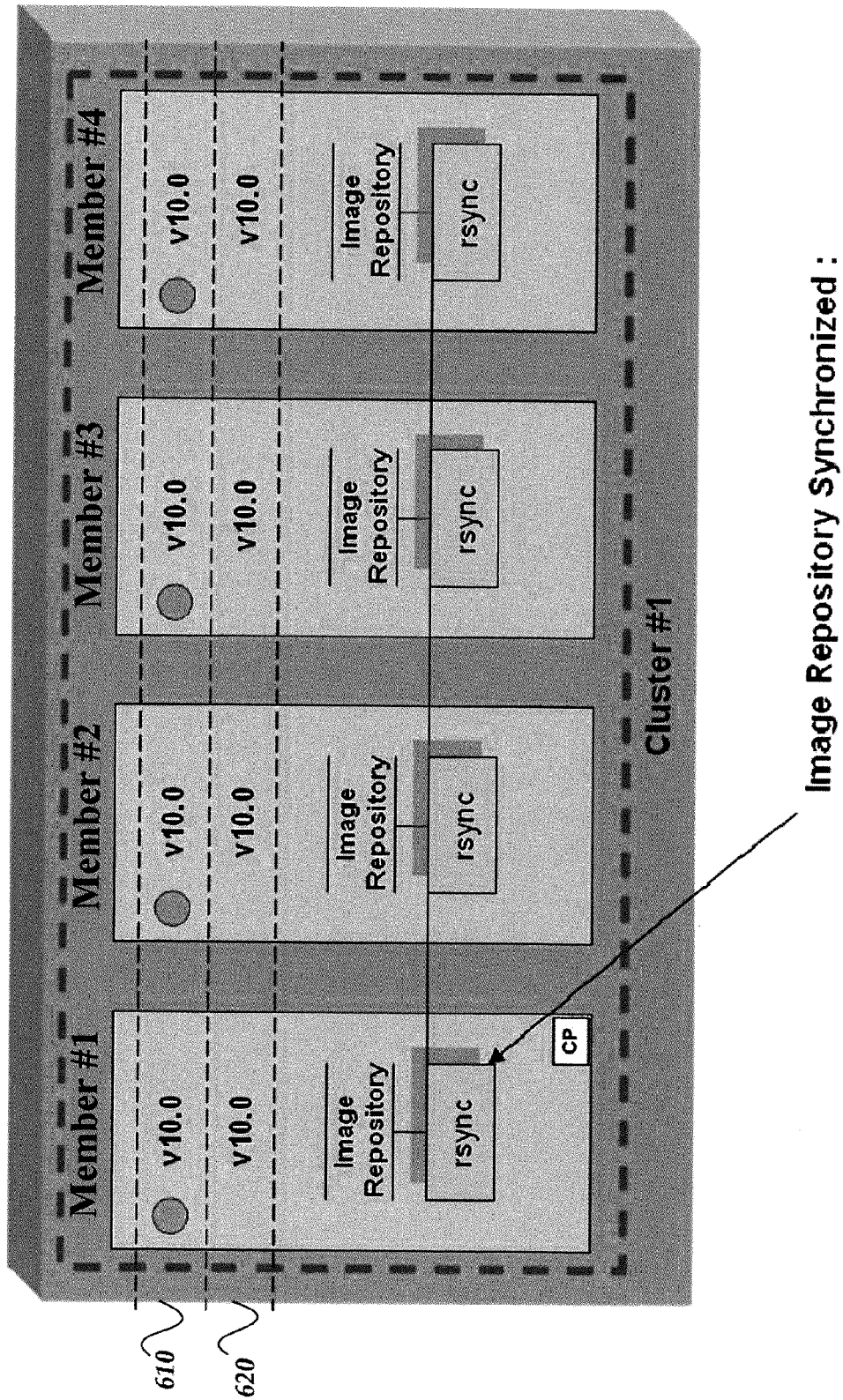

FIG. 6C illustrates Image Repository Synchronization. In one embodiment, files are copied from an image repository in one of the Members to an image repository in one or more of the other Members. Files may be are copied in a background mode of operation. In one embodiment, rsync 640 may be used to synchronize files in the image repositories, although bit torrent or other programs are similarly contemplated.

Figure 6D:
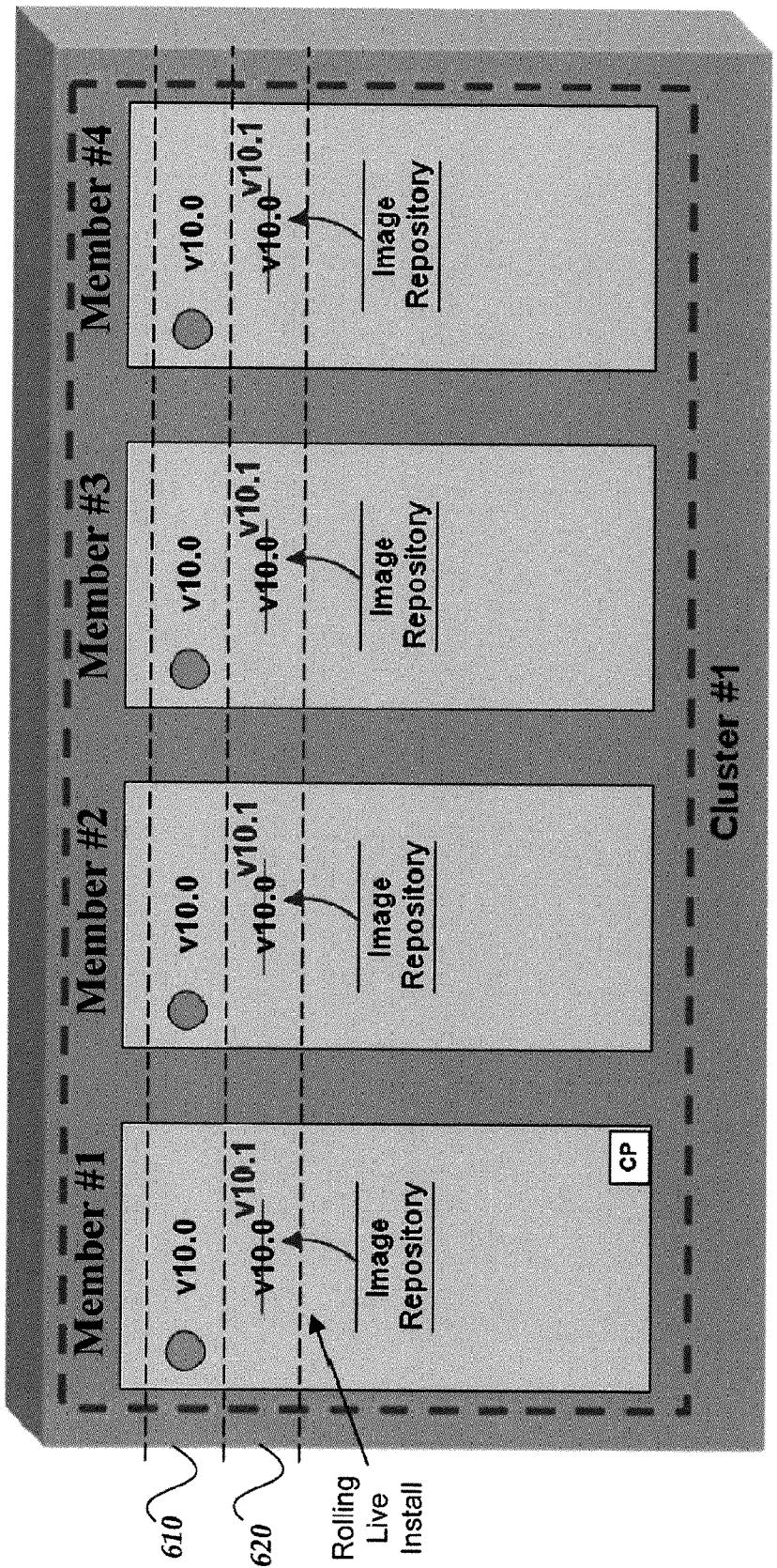

FIG. 6D illustrates a Rolling Live Install. In one embodiment a user selects a particular software version or hotfix to install in a non-active boot partition. In other embodiments a newest available version is automatically installed onto non-active boot partitions. In one embodiment the live rolling install is performed in parallel, such that each member of the cluster installs the software at the same time. Alternatively the live install may be performed in series. For instance, FIG. 6D depicts software version 10.1 replacing software version 10.0 on boot partitions 620 of each of Members #1-4.

FIGS. 7A-7H illustrate one embodiment for upgrading network devices in a cluster environment. At a high level, orchestrating a rolling switchboot may comprise: (1) splitting the cluster into an old (active, or first) virtual cluster for managing network connections and a new (standby, or second) virtual cluster, (2) upgrading the members of the new cluster, and (3) failing over connectivity from the old cluster to the new cluster. As used herein, the term "failover connectivity" refers to maintaining a single network identity before, during, and after failover. In one embodiment, the network identity may include an IP address, a combination of an IP address and a port, a Media Access Control (MAC) address, or the like. By maintaining failover connectivity, a cluster may be upgraded with little or no downtime or loss of data. Additionally or alternatively, a high availability fail-over between clusters may also preserve existing transport layer connections, such as OSI layer 4 connections or TCP connections. Additionally or alternatively, a high availability failover may preserve session state during the upgrade.

In one embodiment a Graphical User Interface (GUI) may enable a user to specify an order in which cluster members migrate to the new cluster. Additionally or alternatively, the GUI may enable a user to specify if state mirroring is desired once approximately half of the Members have been joined to the second cluster, or based on some other condition. The components of FIGS. 7A-7H may include more or fewer components than illustrated. However, the components shown are sufficient to disclose one embodiment or illustration.

Figure 7A:
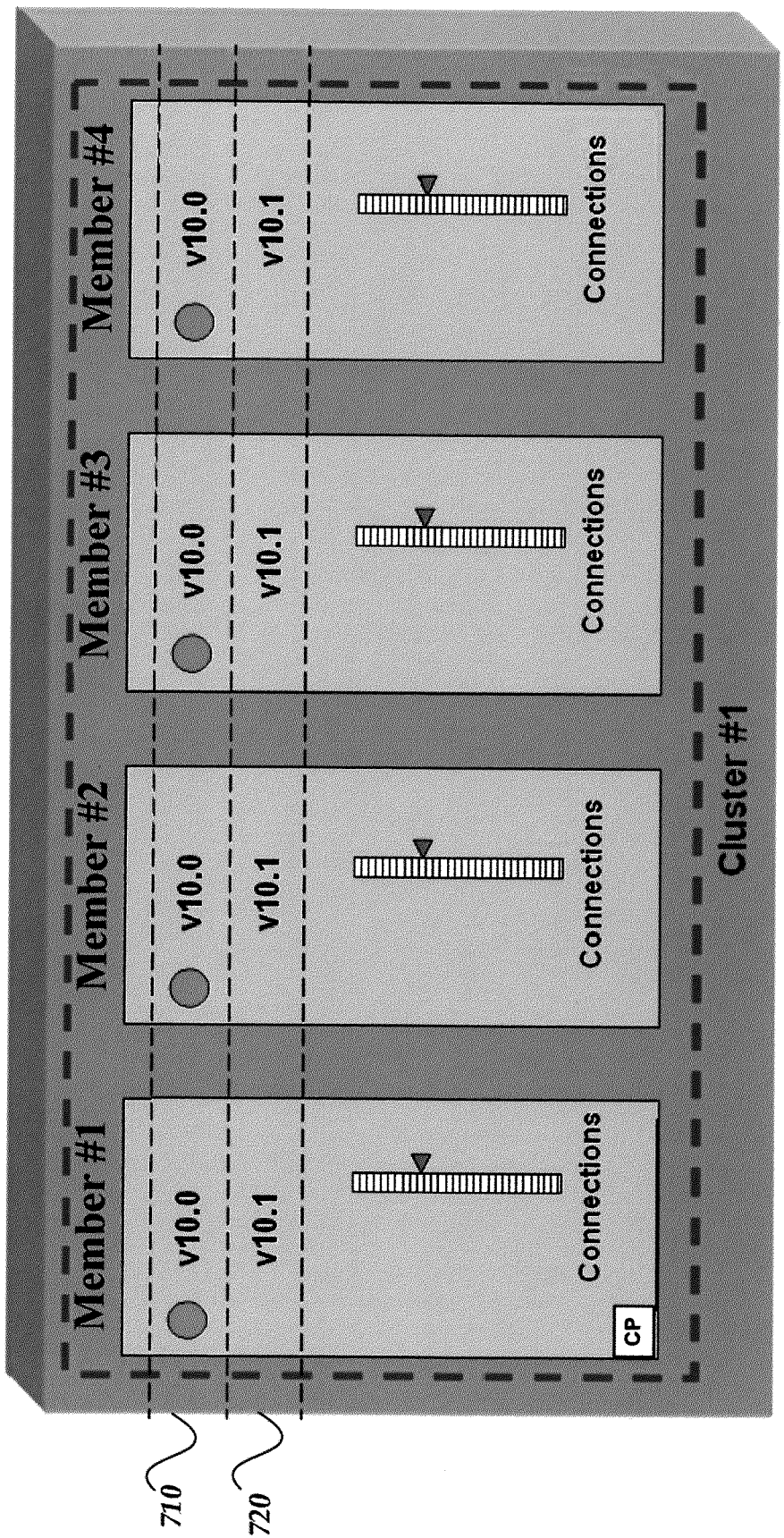
FIGS. 7A-7H illustrate a cluster environment involved with one embodiment of providing low impact connection mirroring and failover.

In one embodiment, FIG. 7A illustrates an environment for a rolling switchboot. Each of Members #1-4 are running an existing software version, in this instance version 10.0 on boot partition 710. While version 10.0 is currently executing, software version 10.1 has been installed on boot partition 720 as described in conjunction with FIGS. 6A-6D. A Control Process (CP) module operating on one or more processors manages interactions between members on behalf of the cluster. Control Process may reside within a single member of the cluster, Control Process may reside and operate within the cluster but outside of the members, or Control Process may in one embodiment reside and operate predominantly outside of the cluster. In one embodiment, the Control Process module performs actions including those discussed below in conjunction with FIGS. 8-10, including mirroring selected information from the first cluster to the second cluster, and determining when a defined threshold of selected information is crossed. In one embodiment the Control Process module upgrades a first member from the first cluster with a defined change in configuration.

Figure 7B:
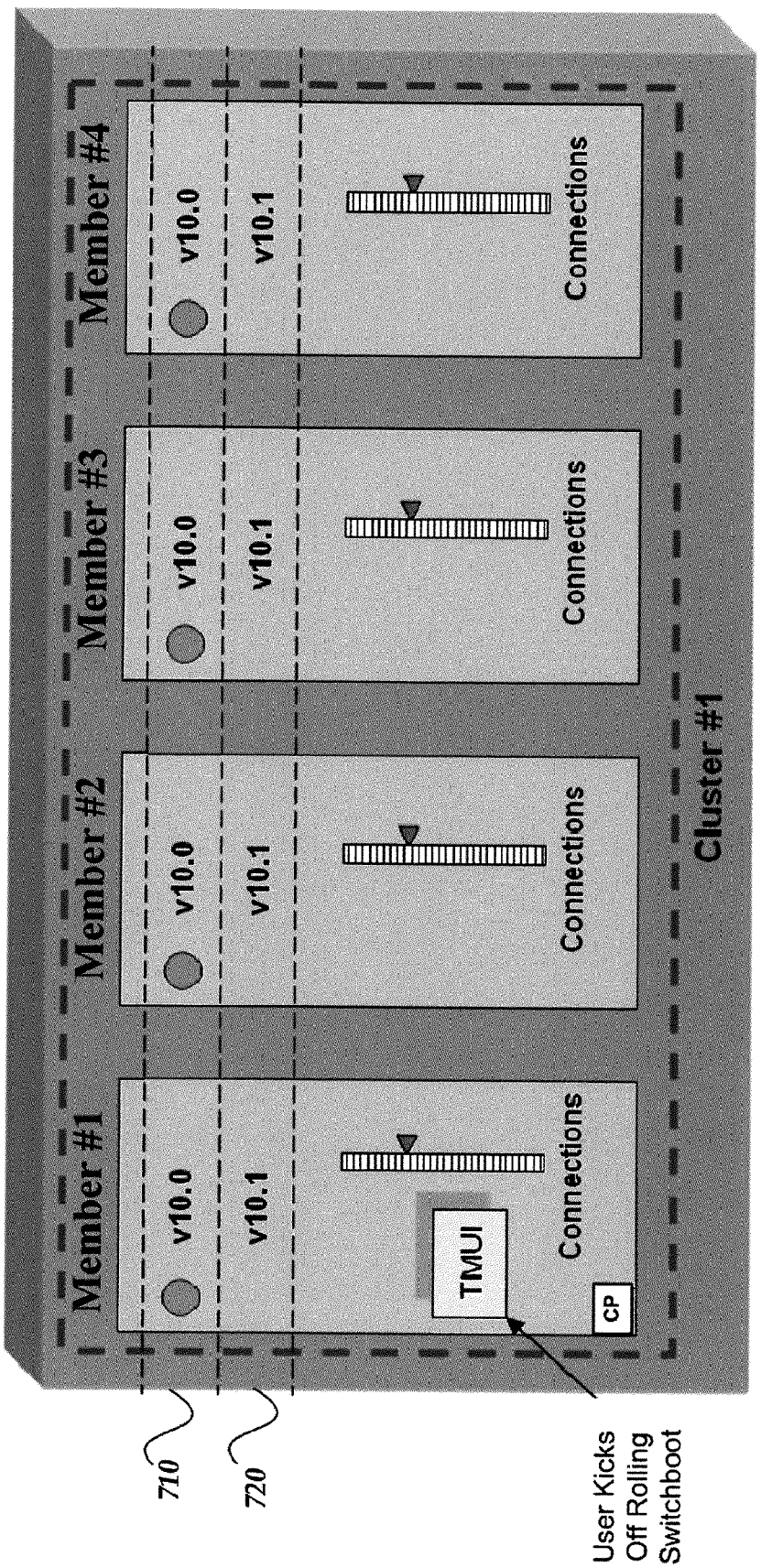

FIG. 7B illustrates the beginning of a rolling switchboot. In one embodiment a user initiates a switchboot through the TMUI, although automated switchboots are similarly contemplated.

Figure 7C:
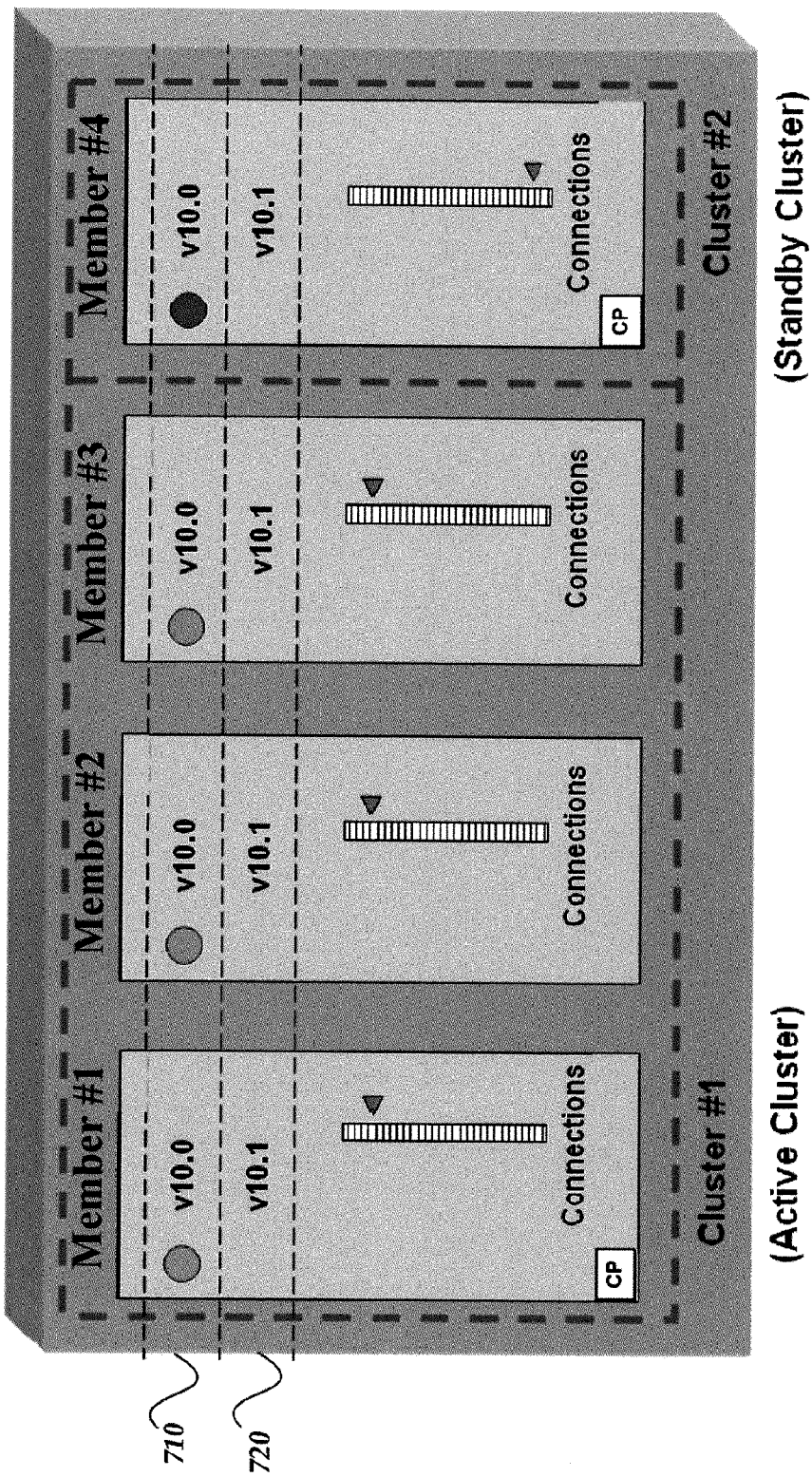

FIG. 7C illustrates bifurcating the cluster. In one embodiment, Cluster #1 is the only cluster, and it is in communication with network 102 through switch 114. Cluster #1 is assigned a single OSI Layer 2 address, such as a MAC address, by which Cluster #1 is known to switch 114.

In one embodiment, Cluster #1 is bifurcated into an old cluster and a new cluster by removing a member from Cluster #1 and creating a second cluster, Cluster #2, out of the removed member. In one embodiment the first member of Cluster #2 is the primary member of Cluster #2, and so the first member of Cluster #2 will include a Control Process for controlling Cluster #2.

In one embodiment Cluster #1 is split at layer 3 of the OSI stack, such that no changes are made to the OSI Layer 2 topology of Cluster #1 and switch 114. In one embodiment, the old and new clusters may coordinate OSI Layer 2 state, such as interface states, LACP (Link Aggregation Connection Protocol) states, STP states, and STP frames, in order to maintain consistent OSI Layer 2 topology. Such state coordination may be achieved between clusters having different software versions, including different versions of the Control Process.

In one embodiment, Cluster #2 may allocate its own Layer 2 address, giving it a unique Layer 2 and Layer 3 identity on the network. Then, in one embodiment, Cluster #2 may connect to Cluster #1 and subscribe to Cluster #1's Layer 2 state information. In addition, Cluster #2 may share Layer 2 state information with Cluster #1. Because Cluster #1 and Cluster #2 typically are executing different software versions, the sharing of Layer 2 state information is typically versioned, such that clusters running newer software versions may communicate with clusters running older software versions.

In one embodiment, each Member contains a Disaggregator table (DAG) that directs the processing of a connection to an appropriate Cluster, Member, and CPU. In one embodiment, each of Cluster #1 and Cluster #2 are assigned virtual identifiers. A virtual identifier may be a virtual ModID, double VLAN tags, a link aggregation identifier, the outer MAC address of a MAC-in-MAC encapsulation, or any other identifier. A DAG may be stateful or stateless. A stateful DAG associates, in memory, a virtual identifier with each active connection, such that the virtual identifier associated with an active connection indicates which Cluster should process the connection. Additionally or alternatively, a DAG may be stateless. A stateless DAG may create an association by hashing connection information, such as a MAC address, protocol, IP address, port, and/or VLAN, to a particular Cluster, Member, and CPU. In one embodiment, bifurcating Cluster #1 includes bifurcating the stateful DAG of each member such that connections destined for the old cluster and connections destined for the new cluster are directed accordingly. In one embodiment the DAG may comprise an ASIC.

In one embodiment Cluster #1 is bifurcated by altering a link aggregation group, or some other spanning tree technology, that spans at least two cluster members of Cluster #1. At least one cluster member that is a member of the link aggregation group (or other spanning tree technology) may be disabled, forcing traffic to the remaining cluster members. In this way, one member of a cluster may be removed from the old cluster, while existing connections continue to be processed by the remaining members of the old cluster. For instance, Member #4 may be disabled. In one embodiment, connections being processed by Member #4 are drained before Member #4 is removed from Cluster #1. Subsequent connections that would have been processed by Member #4 are instead directed to Members #1-3.

Once removed from Cluster #1, Member #4 may become Cluster #2 or be used to create Cluster #2. Upon creation, Cluster #2 may then broadcast it's presence over the network, and begin distributing traffic to itself and to Cluster #1 using the bifurcated DAG. Cluster #2 may also continue to share status updates of interfaces, STP, and link aggregation groups with Cluster #1 in order to maintain Layer 2 state. In one embodiment, the Cluster #2, with a unique Layer 2 and Layer 3 identifier, may act as a "hot standby" to Cluster #1, mirroring connections prior to failover from the first cluster.

Figure 7D:
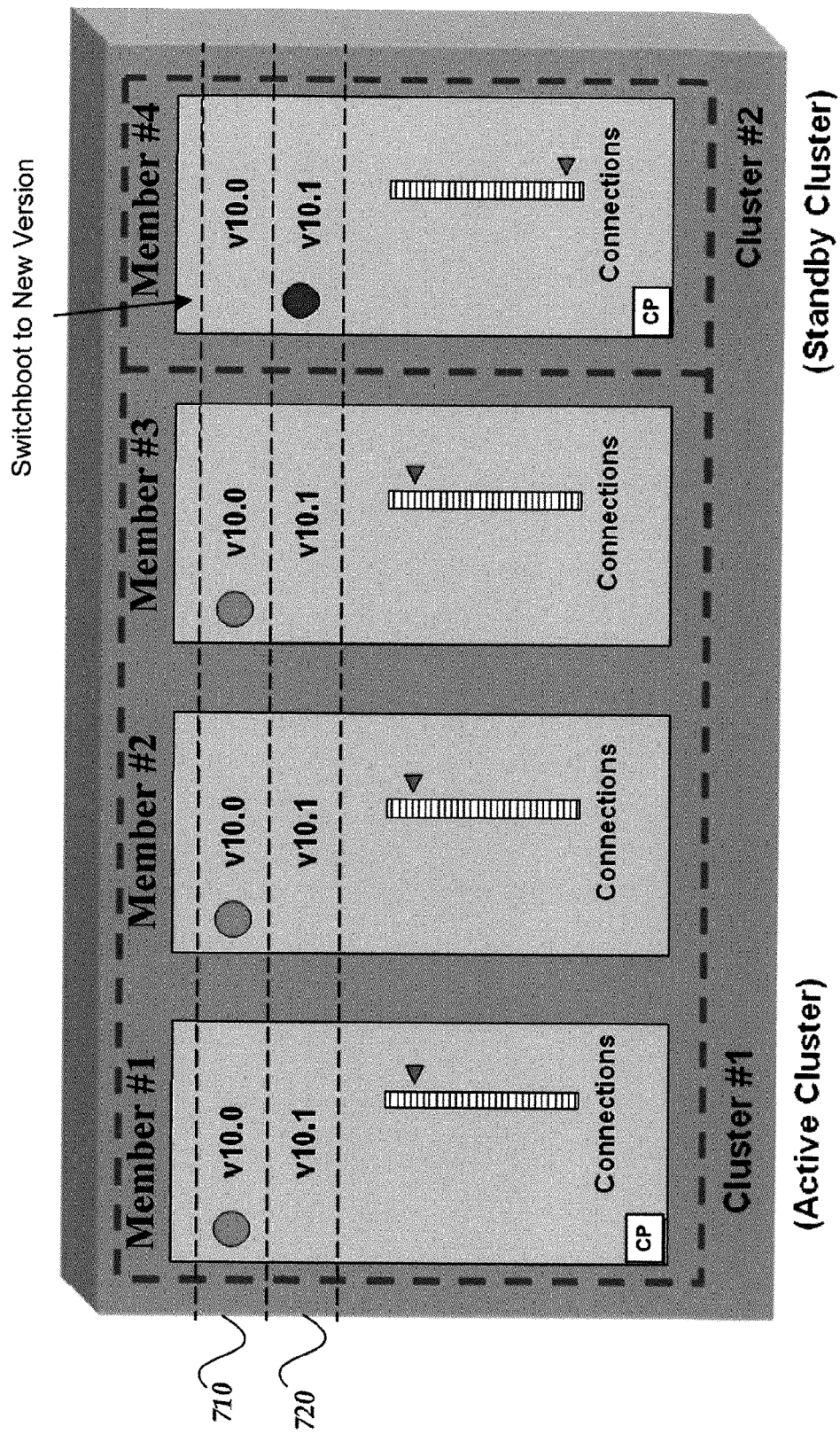

FIG. 7D illustrates switchbooting to a new software version. In one embodiment, upon being added to Cluster #2, Member #4 is upgraded to the new software version. For instance, Member #4 may be upgraded to execute software version 10.1 on boot partition 720. In one embodiment the switchboot is completed by rebooting Member #4. Additional Members, such as Member #3, may optionally be disabled from Cluster #1, added to Cluster #2, and switchbooted into the software version used by Cluster #2.

Figure 7E:
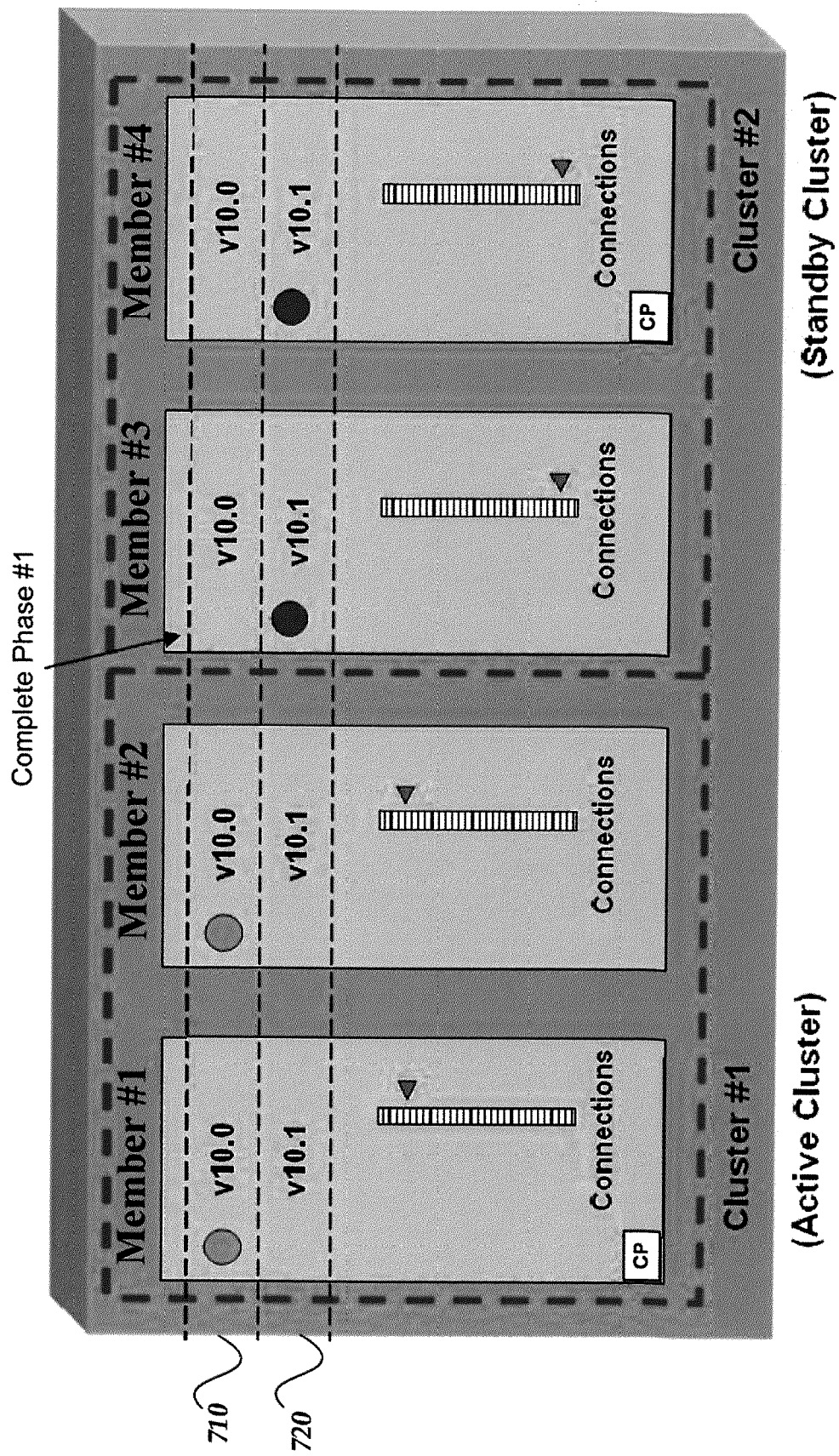

FIG. 7E illustrates an additional member transfer to Cluster #2: Member #3 has connections drained, Member #3 joins Cluster #2, and Member #3 is switchbooted to the upgraded software.

Figure 7F:
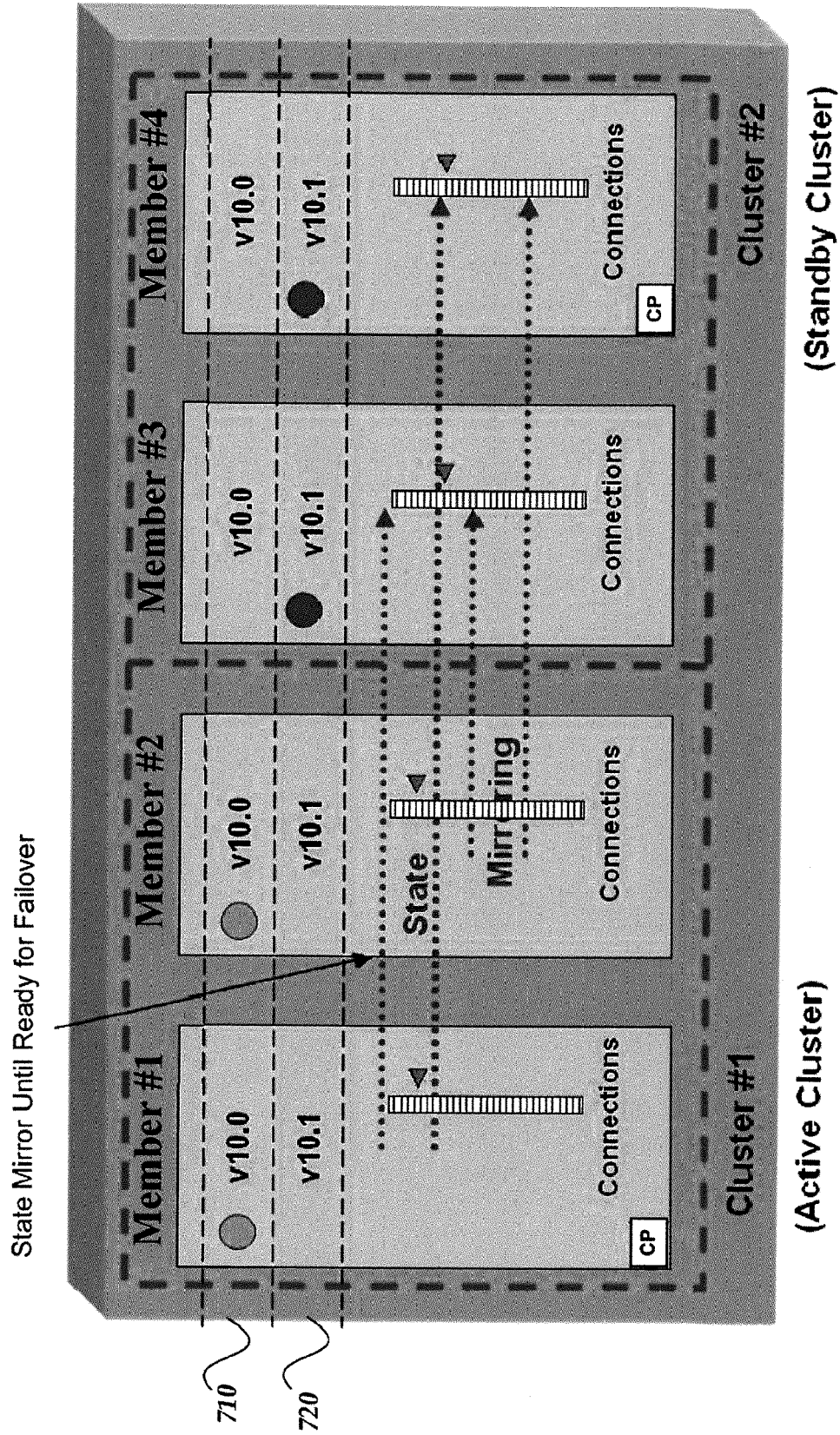

FIG. 7F illustrates optional state mirroring. Configuration state, session state, and connection state may each be mirrored, either individually or any combination. State information mirroring between Cluster #1 and Cluster #2 may be enabled by changing state mirroring configuration from "intra-cluster" to "inter-cluster". Additionally or alternatively, intra-cluster and inter-cluster state mirroring may occur simultaneously. State mirroring may transfer configuration, session, connection, persistence, and other state from the active cluster (Cluster #1) to the standby cluster (Cluster #2). In one embodiment, state mirroring may transfer OSI Layer 4 connection data and OSI Layer 7 data from Cluster #1 to Cluster #2. In general, any state that is not affected by the upgrade from the old software version to the new software version may be transferred directly between clusters during state mirroring. Any state that cannot be automatically upgraded from the old software version to the new software version may be manually updated while connections continue to be processed by Cluster #1. In one embodiment, state mirroring may occur once clusters are approximately evenly balanced. Such approximation may be based on some threshold or some other criteria.

Figure 7G:
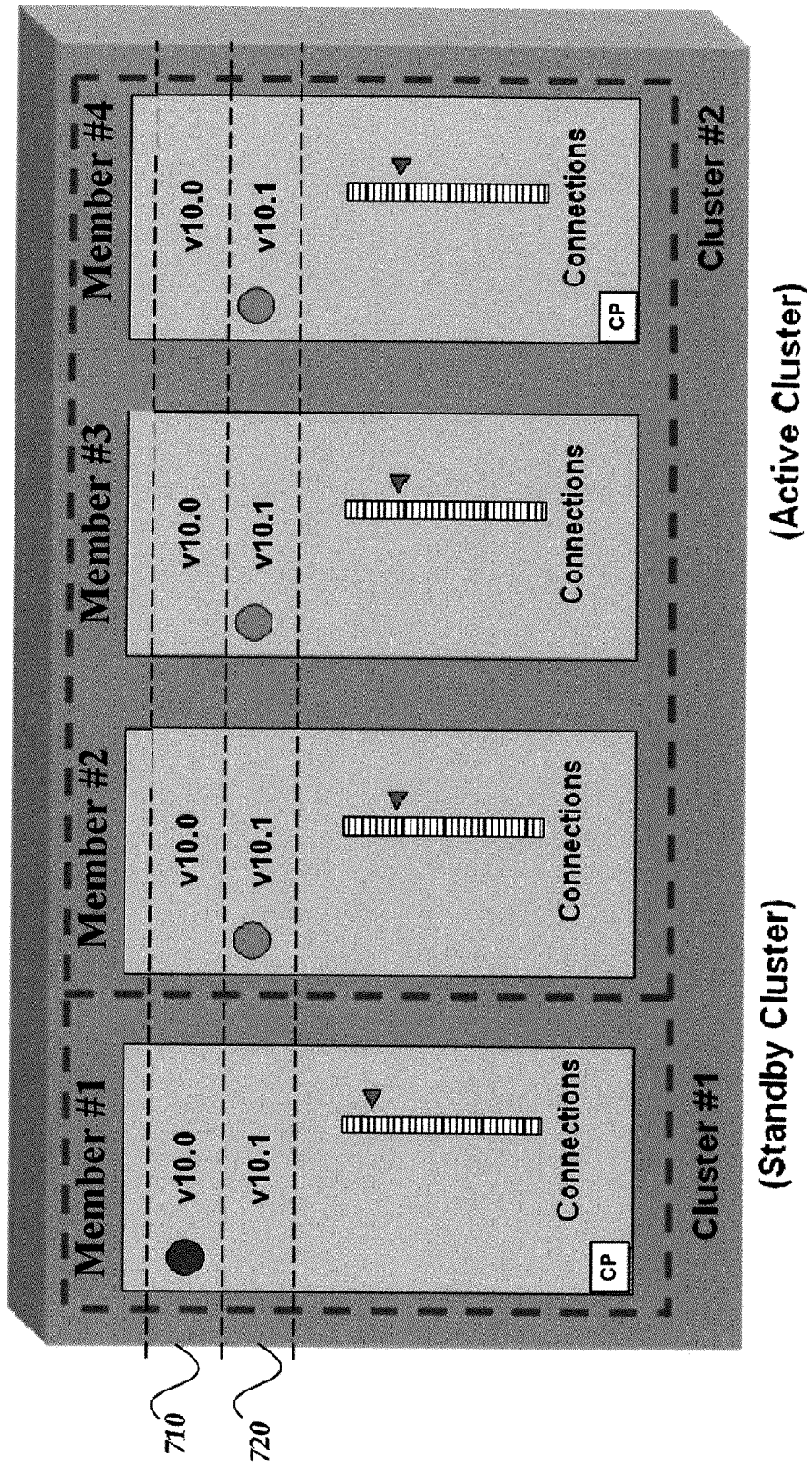
Figure 7H:
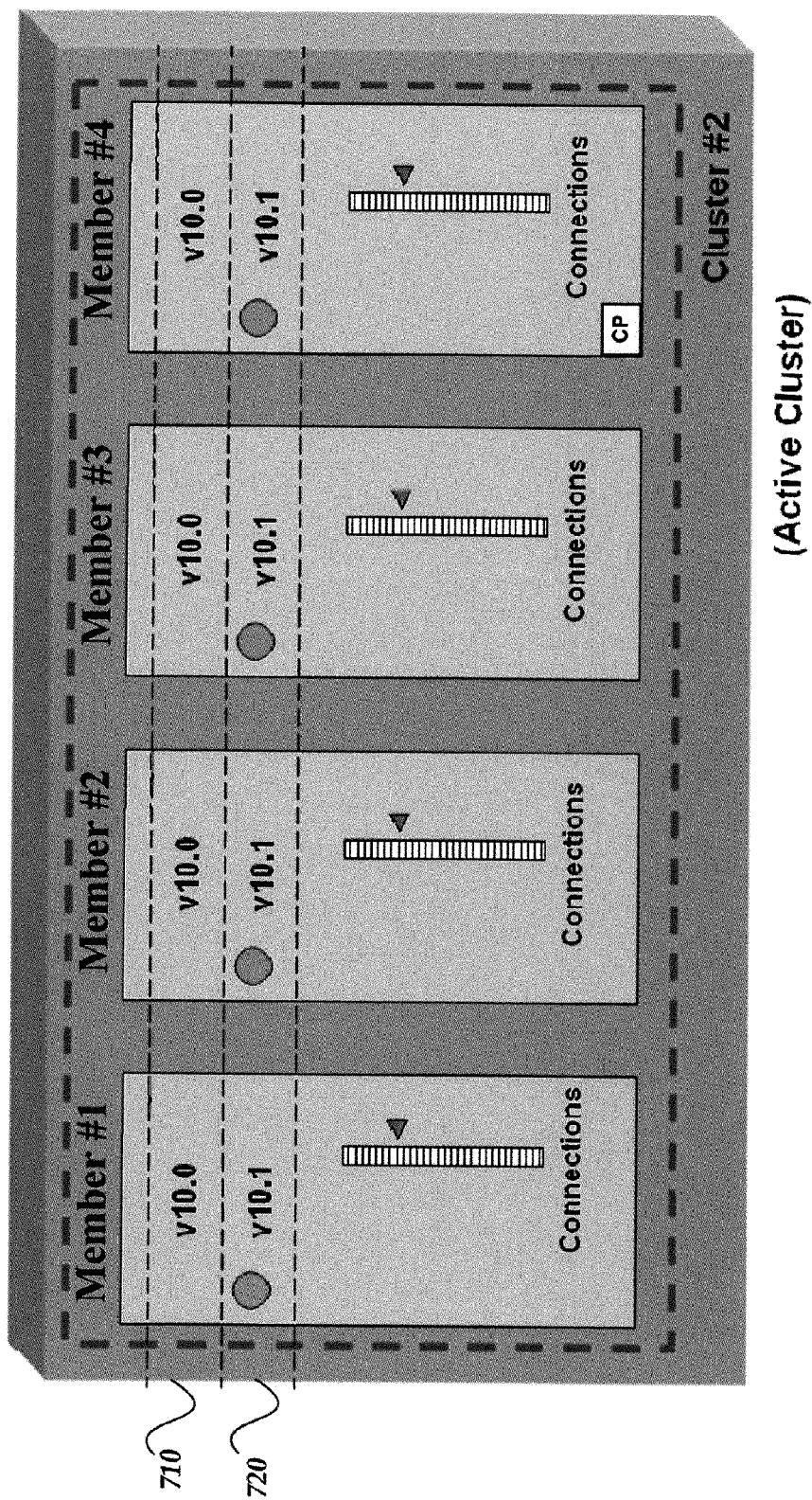

FIGS. 7G and 7H illustrate failing over connectivity from the Cluster #1 to the Cluster #2, after which Cluster #1 is dissolved, and disabled members of Cluster #1 may install and boot the upgraded software version. Failover is the process of passing control and the processing of connections from one cluster to the other. Failover may occur at a certain time of day, under a certain workload threshold, or any other criteria as determined by the user. Once failover occurs, the Cluster #2 (now the 'active cluster' for managing network connections) may switch back to intra-cluster state mirroring mode. As depicted, FIGS. 7G and 7H illustrate regrouping member #2 and then member #1 into the new cluster.

In one embodiment, seamlessly failing over connectivity from Cluster #1 to Cluster #2 is performed without modifying the data link (OSI layer 2) address of Cluster #1, or without otherwise modifying the data link topology of Cluster #1 and switch 114. In this embodiment, failing over connectivity may include assigning the data link layer address (for example, the Media Access Control (MAC) address) of Cluster #1 to Cluster #2, such that Cluster #2 takes on the data link layer network identity of Cluster #1.

Additionally or alternatively, failing over connectivity from Cluster #1 to Cluster #2 is performed by using the Address Resolution Protocol (ARP) to inform neighboring network nodes that the MAC address of the network device being upgraded has moved to the network address of the second cluster. In this way, incoming packets addressed to Cluster #1 will be routed to the MAC address of Cluster #2, thereby failing over connectivity from Cluster #1 to Cluster #2. In either case, connectivity is maintained during failover, meaning a single network of the cluster identity persists before, during, and after the upgrade with virtually no loss of data or connections.

FIG. 8 illustrates a logical flow diagram generally showing one embodiment of a process for managing an upgrade to a cluster of network devices in part by removing a member from a first cluster and adding it to a second cluster.

Process 800 begins, after a start block, at block 810, by removing a cluster member from a first cluster. In one embodiment, a first member is selected from a plurality of members in the first cluster. In one embodiment the second cluster is created by bifurcating the first cluster. In one embodiment, bifurcation of the first cluster may include reallocating at least one connection from the selected first member to at least one other member in the first cluster. By reallocating this connection, the connection continues to be seamlessly handled while allowing the selected first member to be removed from the first cluster. After reallocating the connection, the second cluster may be created by transferring the selected first member into another cluster, such that the selected first member is a first member of the created second cluster. Alternatively, the second cluster may be explicitly created, and then the selected first member may be removed from the first cluster and added to a second cluster. In one embodiment, reallocating a connection includes draining and/or bleeding off connections from the first member, as described in more detail below in conjunction with process 900. In one embodiment, creating the new second cluster further designates the first member as a primary member of the new second cluster. Primary members are typically acknowledged as the master of the cluster.

At block 830, the selected first member is modified. In one embodiment the selected first member is modified by upgrading to a new configuration. Additionally or alternatively, the selected first member is upgraded to a new configuration automatically upon being added to the second cluster. In one embodiment, updating the configuration of the selected first member includes updating to a new software version.

Processing next continues to block 850, where the upgraded member is added to the second cluster. As discussed above, the first selected member may be added to the second cluster after the second cluster is created. Alternatively, the second cluster is created out of the first selected member, in which case the first selected member is added to the second cluster as the second cluster is being created.

Processing next continues to block 870, where it is determined whether another member remains in the first cluster. If another member remains in the first cluster, processing loops back to step 810 and another member of the first cluster is removed and upgraded while being joined as a member to the second cluster. In one embodiment block 870 continues for a defined number of other members in the active first cluster. In one embodiment, the defined number is determined to be approximately equal to half of a total number of members in the first cluster. In one embodiment, state mirroring begins when approximately half of the total number of members are contained in each of the two clusters. For example, when the total number of members of the cluster is even, then exactly half may be distributed between the two clusters. Where the numbers are not even, then one cluster may have one or more additional members than the other cluster. Such partitioning may be predefined, user settable, or based on some other criteria. If no members remain in the first cluster, then all of the members of the original cluster have been modified and added to the second cluster. Upon completion of block 870, processing returns to a calling process.

FIG. 9 illustrates a logical flow diagram generally showing one embodiment of a process for removing, or draining connections from a member of a cluster. In one embodiment, a connection is drained when a connection that existed before bifurcation is allowed to gracefully end. In one embodiment, draining a connection includes processing all packet exchanges, including data link and network link layer (OSI layers 2 and 3) packet exchanges, at the first cluster. After processing of these packets has been completed due to a natural end to the connection, a transport layer (OSI layer 4) connection at the first cluster may be closed.

Process 900 begins, after a start block, at block 910, where a member of a cluster is selected. Alternatively, a member could have already been selected in step 810 above.

Processing next continues to block 920, where connections are reallocated, to the extent possible, from the selected member. In one embodiment, draining connections is enabled by employing intra-cluster state mirroring. This way, connection state is directly copied from one member to another member, allowing the first member to be removed from the cluster without dropping the connection. Additionally or alternatively, draining at least one existing connection further comprises redirecting a request for a new connection from each member to be joined to the second cluster to another member in the first cluster.

In addition to waiting for a connection to drain or by employing intra-cluster state mirroring to move an existing connection, connection reallocation may include taking active steps to reduce the lifespan of the connection. For example, network traffic may be modified to force a reset of a network connection, causing the connection to be migrated to another member. Forcing a reset may include terminating or otherwise rudely ending the connection. Rudely ending the connection may immediately remove the connection from the member, but also result in data loss.

Additionally or alternatively, another active step taken to reduce the lifespan of the connection includes "bleeding off" a connection. Bleeding off a connection may include modifying the connection in a way that causes the connection to be voluntarily terminated by the client earlier than if the connection were not modified. This procedure may be protocol-specific. For example, if it is detected that a connection is utilizing the HTTP protocol in a client-server environment, the HTTP KEEP-ALIVE time period attribute may be detected and/or reduced or disabled as an HTTP response is transmitted to the HTTP client, or as an HTTP request is transmitted to the HTTP server. By reducing or disabling the HTTP KEEP ALIVE attribute, the HTTP client will create a new HTTP connection the next time it connects to the HTTP server. This new connection may be handled by another member of the first cluster, ensuring seamless access by the client while allowing the member that originally handled the connection to be upgraded and installed into the second cluster. Depending on how long the client takes to initiate the new connection, failover may have already occurred, such that the new connection will be handled by the second cluster. A connection may also be bled-off by changing the connection header value of an HTTP request or response to "close".

FIG. 10 illustrates a logical flow diagram generally showing one embodiment of a process for bifurcating a cluster.

Process 1000 begins, after a start block, at block 1010, where a Layer 2 (L2) identifier for a second cluster is identified. In one embodiment this L2 identifier is broadcast to other local network elements.

Processing next continues to block 1020, where one member of the first cluster is identified as a member of the second cluster. In one embodiment, the identified member is upgraded to the software version used in the second cluster upon being added as a member of the second cluster.

Processing next continues to block 1030, where members of the second cluster are fully activated.

Processing next continues to decision block 1040, where it is determined whether the first and second clusters contain approximately the same number of members. If this is true, then processing continues to block 1050, where state information, including configuration state, session state, connection state, and the like is optionally mirrored from the first cluster to the second cluster. If the clusters do not contain approximately the same number of members, then processing continues to decision block 1060. Once connection state has been mirrored, the second cluster enters "hot standby mode", actively building up and mirroring state information associated with connections managed by the first active cluster. This state is mirrored by actively monitoring the network for packets addressed to the first cluster. By entering "hot standby mode" and mirroring state in this way, connection state may effectively be transferred between clusters executing different software versions.

At block 1060, it is determined whether a defined failover condition or criteria has been satisfied. A failover condition may be user configured. For instance, a failover condition may be set to occur at a certain time of day or within a certain range of time. A failover condition may be set to occur on a particular day of the week, when a certain level of network activity is detected, or the like. Alternatively, a failover may be manually triggered directly by a user. Additionally or alternatively, failover may be triggered when a defined number of connections are mirrored above a defined threshold and/or amount of state information managed by the first active cluster is detected as being mirrored by the second active cluster. For instance, failover may be triggered when, for example, 75% of connection state data is shared between the first and second clusters. Alternatively, failover may be triggered when, for example, 95% of connection state data is shared between the first and second clusters. Additionally or alternatively, failover may be triggered when the amount of shared connection state data enters a range, such as between 60-65%. A combination factors may also trigger a failover. For instance, if the time of day is early morning, the percentage of shared connection state may only need to be 75% in order to trigger a failover. However, if the upgrade is taking place in the middle of the work day, 95% of shared connection state may be required before a failover is triggered. If a failover condition occurs, processing continues to block 1070 where connections fail over from the active first cluster to the second cluster, such that the second cluster is set as the active cluster, and the first cluster is disbanded. After failover of the first cluster, each remaining member of the first cluster is upgraded to a defined configuration. The remaining members are joined to the second cluster, wherein the second cluster becomes the active cluster for managing network connections. As discussed above, connectivity failover may in one embodiment be implemented using the Address Resolution Protocol (ARP) to inform neighboring network nodes, such as switch 114, that the Media Access Control (MAC) address of the first cluster is to be replaced in the neighboring network nodes with the MAC address of the second cluster. In this way, IP addresses received by a neighboring network node such as switch 114 will be translated to the MAC address of the second cluster, thereby seamlessly transferring control and processing to the second cluster while maintaining connectivity. Also as discussed above, connectivity failover may additionally or alternatively be implemented by replacing, at the second cluster, the MAC address of the second cluster with the MAC address of the first cluster. In this way, network traffic that had been received and processed by the first cluster will be received and processed by the second cluster, again thereby seamlessly transferring control and processing to the second cluster while maintaining connectivity. The process then terminates at a return block.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A method operated in conjunction with one or more processors to update network devices, comprising:
    selecting a first member within a plurality of members in a first cluster;
    bifurcating the first cluster, wherein the bifurcation comprises:
        creating a second cluster, wherein the second cluster includes the selected first member;
        activating the first member within the second cluster, wherein the first member is activated with a defined configuration upgrade; and
        iteratively upgrading each other member in the first cluster by:

employing cluster state mirroring to move an existing connection managed by a member to be joined in the second cluster by at least one other member in the first cluster;
removing the member to be joined in the second cluster from the first cluster;
upgrading the member to be joined in the second cluster with the defined upgrade; and
joining the upgraded member as a member to the second cluster; and
determining if a defined failover criteria is satisfied, and if the defined failover criteria is satisfied, failing over connectivity from the first cluster to the second cluster such that the second cluster becomes an active cluster for managing connections.

2. The method of claim 1, wherein employing cluster state mirroring further comprises allowing an existing connections within the first cluster to drain by redirecting new connections from the first cluster to the second cluster.

3. The method of claim 1, wherein employing cluster state mirroring further comprises reducing an keep-alive value to a connection to bleed the connection from the first cluster.

4. The method of claim 1, wherein employing cluster state mirroring further includes mirroring configuration state, session state, and connection state information to the second cluster.

5. The method of claim 1, wherein employing cluster state mirroring further comprising transferring of Opens Systems Interconnection layer 4 connection data between the first cluster and the second cluster.

6. The method of claim 1, wherein employing cluster state mirroring comprises using intra-cluster and inter-cluster state mirroring.

7. The method of claim 1, wherein failing over connectivity further comprises assigning a data link layer address of the first cluster to the second cluster, such that the second cluster takes on the data link layer address of the first cluster.

8. An apparatus comprising a non-transitory computer readable medium, having computer-executable instructions stored thereon, that in response to execution by a computing device, cause the computing device to perform operations, comprising:
selecting a first member within a plurality of members in a first cluster;
bifurcating the first cluster, wherein the bifurcation comprises:
creating a second cluster, wherein the second cluster includes the selected first member;
activating the first member within the second cluster, wherein the first member is activated with a defined configuration upgrade; and
iteratively upgrading each other member in the first cluster by:
employing cluster state mirroring to move an existing connection managed by a member to be joined in the second cluster by at least one other member in the first cluster;
removing the member to be joined in the second cluster from the first cluster;
upgrading the member to be joined in the second cluster with the defined upgrade; and
joining the upgraded member as a member to the second cluster; and
determining if a defined failover criteria is satisfied, and if the defined failover criteria is satisfied, failing over connectivity from the first cluster to the second cluster such that the second cluster becomes an active cluster for managing connections.

9. The apparatus of claim 8, wherein employing cluster state mirroring further comprises allowing an existing connections within the first cluster to drain by redirecting new connections from the first cluster to the second cluster.

10. The apparatus of claim 8, wherein employing cluster state mirroring further comprises reducing an keep-alive value to a connection to bleed the connection from the first cluster.

11. The apparatus of claim 8, wherein employing cluster state mirroring further includes mirroring configuration state, session state, and connection state information to the second cluster.

12. The apparatus of claim 8, wherein failing over connectivity comprises performing an address resolution protocol.

13. The apparatus of claim 8, wherein when it is determined that the first cluster and the second cluster include a defined number of members, and inter-state mirroring of the first cluster's connection state is at a determined level, then enabling the second cluster to enter a hot standby mode.

14. The apparatus of claim 8, wherein failing over connectivity further comprises assigning a data link layer address of the first cluster to the second cluster, such that the second cluster takes on the data link layer address of the first cluster.

15. The apparatus of claim 8, wherein employing cluster state mirroring further comprises draining existing connections in the first cluster by performing a protocol-specific action to shutdown at least one existing connection.

16. A system, comprising:
a first cluster having a plurality of members, the first cluster being an active cluster to manage network connections; and
one or more processors performing actions, including:
selecting a first member within the plurality of members in the first cluster;
bifurcating the first cluster, wherein the bifurcation comprises;
creating a second cluster, wherein the second cluster includes the selected first member;
activating the first member within the second cluster, wherein the first member is activated with a defined configuration upgrade; and
iteratively upgrading each other member in the first cluster by:
employing cluster state mirroring to move an existing connection managed by a member to be joined in the second cluster by at least one other member in the first cluster;
removing the member to be joined in the second cluster from the first cluster;
upgrading the member to be joined in the second cluster with the defined upgrade; and
joining the upgraded member as a member to the second cluster; and
determining if a defined failover criteria is satisfied, and if the defined failover criteria is satisfied, failing over connectivity from the first cluster to the second cluster such that the second cluster becomes an active cluster for managing connections.

17. The system of claim 16, wherein employing cluster state mirroring further comprises allowing an existing connections within the first cluster to drain by redirecting new connections from the first cluster to the second cluster.

18. The system of claim 16, wherein employing cluster state mirroring further comprises reducing an keep-alive value to a connection to bleed the connection from the first cluster.

19. The system of claim 16, wherein employing cluster state mirroring further includes mirroring configuration state, session state, and connection state information to the second cluster.

20. The system of claim 16, wherein state mirroring further comprising transferring of Opens Systems Interconnection layer 4 connection data between the first cluster and the second cluster.

* * * * *